US010474505B2

(12) United States Patent
Holmberg et al.

(10) Patent No.: US 10,474,505 B2
(45) Date of Patent: Nov. 12, 2019

(54) SYSTEMS AND METHODS OF MANAGING COMPUTATIONAL RESOURCES

(71) Applicant: Telefonaktiebolaget LM Ericsson (publ), Stockholm (SE)

(72) Inventors: Torgny Holmberg, Lund (SE); Johan Eker, Lund (SE); Joakim Persson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 15/560,075

(22) PCT Filed: Sep. 1, 2017

(86) PCT No.: PCT/EP2017/071982
§ 371 (c)(1),
(2) Date: Sep. 20, 2017

(87) PCT Pub. No.: WO2018/042002
PCT Pub. Date: Mar. 8, 2018

(65) Prior Publication Data
US 2018/0246766 A1 Aug. 30, 2018

Related U.S. Application Data

(60) Provisional application No. 62/382,971, filed on Sep. 2, 2016.

(51) Int. Cl.
*G06F 9/50* (2006.01)
*G06F 17/18* (2006.01)
(52) U.S. Cl.
CPC .......... *G06F 9/5038* (2013.01); *G06F 9/5066* (2013.01); *G06F 17/18* (2013.01)

(58) Field of Classification Search
CPC ..................................................... G06F 9/5038
(Continued)

(56) References Cited

U.S. PATENT DOCUMENTS 6,785,889 B1 *  8/2004  Williams ................. G06F 9/50
                                                    709/229
7,069,375 B2 *  6/2006  Avida ..................... H04L 45/10
                                                    370/912

(Continued)

FOREIGN PATENT DOCUMENTS

EP        2541408 A1    6/2011

OTHER PUBLICATIONS

Foster, Ian, et al. "A distributed resource management architecture that supports advance reservations and co-allocation." 1999 Seventh International Workshop on Quality of Service. IWQoS'99.(Cat. No. 98EX354). IEEE, 1999.pp. 27-36 (Year: 1999).*

(Continued)

*Primary Examiner* — Satish Rampuria
(74) *Attorney, Agent, or Firm* — Coats & Bennett, PLLC

(57) ABSTRACT

Systems and methods of managing computational resources are provided. In one exemplary embodiment, a method by a controller (305, 407, 500, 600, 700, 1101) for managing computational resources may include dynamically distributing (801) computational resource shares among sequential services that are mapped to one or more processors (303, 403). Further, each sequential service corresponds to an execution step of a remote application (307, 409). Also, a service chain (313-315, 413-415) comprises at least one sequential service. The dynamical distribution is based on estimated and predetermined tail latencies and average execution times of each sequential service in the service
(Continued)

chain as well as the service chain such that the latencies are met. In addition, the one or more service chains are executed contemporaneously.

16 Claims, 25 Drawing Sheets

(58) Field of Classification Search
USPC .................................................. 718/1–108
See application file for complete search history.

(56) References Cited

U.S. PATENT DOCUMENTS

| | | | | |
|---|---|---|---|---|
| 8,291,411 | B2* | 10/2012 | Beaty | G06F 9/4856 718/1 |
| 2002/0184398 | A1* | 12/2002 | Orenshteyn | G06F 9/5055 719/310 |
| 2015/0277980 | A1* | 10/2015 | Ovsiankin | G06F 9/5066 718/104 |

OTHER PUBLICATIONS

Bobroff, Norman, Andrzej Kochut, and Kirk Beaty. "Dynamic placement of virtual machines for managing sla violations." 2007 10th IFIP/IEEE International Symposium on Integrated Network Management. IEEE, 2007.pp. 119-128 (Year: 2007).*

Nolan, Richard L. "Managing the computer resource: a stage hypothesis." Communications of the ACM 16.7 (1973): pp. 399-405. (Year: 1973).*

Cohen, J.W., "On Networks with Generalized Processor Sharing (and a new Property of Erlang's B Formula)," Presented at Ninth International Teletraffic Congress, Torremolinos, Spain, Oct. 16, 1979, pp. 1-7.

Buttazzo, G., et al., "Partitioning parallel applications on multiprocessor reservations," 22nd Conference on Real-Time Systems (ECRTS), Brussels, Belgium, Jul. 6, 2010, pp. 1-10. DOI: 10.1109/ECRTS.2010.12.

Abhaya, V.G., et al., "Performance Analysis of EDFT Scheduling in a Multi-Priority Preemptive M/G/1 Queue," IEEE Transactions on Parallel and Distributed Systems, vol. 25, No. 8, Aug. 1, 2014, pp. 2149-2158.

Jones, M.T., "Inside the Linux 2.6 Completely Fair Scheduler, Providing fair access to CPUs since 2.6.23," IBM DeveloperWorks, Dec. 15, 2009, pp. 1-8.

Liu, C.L, et al., "Scheduling Algorithms for Multiprogramming in a Hard-Real-Time Environment," Journal of the Association for Computing Machinery, vol. 20, No. 1, Jan. 1, 1973, pp. 46-61.

Parekh, A.K., "A Generalized Processor Sharing Approach to Flow Control in Integrated Services Networks: The Single-Node Case," IEEE/ACM Transactions on Networking, vol. 1, No. 3, Jun. 1, 1993, pp. 344-357.

Bini, E., et al., "Schedulability Analysis of Periodic Fixed Priority Systems," IEEE Transactions on Computers, vol. 53, Issue 11, Sep. 27, 2004, pp. 1462-1473. DOI: 10.1109/TC.2004.103.

Bini, E., et al., "Resource management on multicore systems: The ACTORS approach," IEEE Micro, vol. 31, Issue 3, Jan. 6, 2011, pp. 72-81. DOI: 10.1109/MM.2011.1.

* cited by examiner

800

801

BY A CONTROLLER FOR MANAGING COMPUTATIONAL RESOURCES, DYNAMICALLY DISTRIBUTE COMPUTATIONAL RESOURCE SHARES AMONG SEQUENTIAL SERVICES THAT ARE MAPPED TO ONE OR MORE PROCESSORS, WHEREIN EACH SEQUENTIAL SERVICE CORRESPONDS TO AN EXECUTION STEP OF A REMOTE APPLICATION AND WHEREIN A SERVICE CHAIN COMPRISES AT LEAST ONE SEQUENTIAL SERVICE, BASED ON ESTIMATED AND PREDETERMINED TAIL LATENCIES AND AN AVERAGE EXECUTION TIME OF EACH SEQUENTIAL SERVICE IN THE SERVICE CHAIN AS WELL AS THE SERVICE CHAIN SUCH THAT THE LATENCIES ARE MET, AND WHEREIN THE ONE OR MORE SERVICE CHAINS ARE EXECUTED CONTEMPORANEOUSLY

FIG. 8

SYSTEMS AND METHODS OF MANAGING COMPUTATIONAL RESOURCES

FIELD OF DISCLOSURE

The present disclosure relates generally to the field of computer systems, and in particular to managing computational resources.

BACKGROUND

Cloud technology has swiftly transformed the Information and Communications Technology (ICT) industry and is starting to make inroads in more classical industries, such as manufacturing and mining. While cloud technology has provided the benefits of reduced capital and operating expenditures, some of the challenges for industrial applications are different from traditional ICT applications. Further, industrial applications have stronger timing and availability requirements. For example, controlling a set of collaborating robots on an assembly line or coordinating vehicles in a platoon will demand tighter computational delay requirements. In particular, tail latencies are of special interest as the maximum response time will limit possible performance of an industrial application. In order to extend the cloud concepts beyond the ICT domain and apply it to mission critical use cases such as industrial automation, transport and health care, performance predictability and guarantee of a particular use case should be defined. Further, cloud providers give few or no guarantees with respect to latency and timing of their systems in general. While this is typically not an issue for traditional ICT applications, it poses challenges for industrial automation and network processing. For example, FIG. 9 illustrates a traditional distributed control system with delays. See Johan Nilsson, "Real-Time Control Systems with Delays," Ph.D. thesis, 1998. A sensor node samples the output state of the process and transmits it to a controller node where the next control signal is computed and transmitted to an actuator node. The times delays $\tau_k^{ca}$ and $\tau_k^{sc}$ substantially influence the control performance. With current 4$^{th}$ Generation of Wireless Mobile Telecommunications (4G) technology, each of these delays is typically in the range of thirty milliseconds (30 msec.) to one hundred milliseconds (100 msec.) or longer. With the introduction of 5$^{th}$ Generation of Wireless Mobile Telecommunications (5G) technology, these delays are expected to be reduced to a few milliseconds or less.

Accordingly, there is a need for improved techniques for managing computational resources such as in time-restrained industrial applications. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiment of the present disclosure relate to systems and methods of managing computational resources. According to one aspect, a method performed by a controller for managing computational resources may include dynamically distributing computational resource shares among sequential services that are mapped to one or more processors. Further, each sequential service corresponds to an execution step of a remote application. Also, a service chain comprises at least one sequential service. The dynamical distribution is based on estimated and predetermined tail latencies and average execution times of each sequential service in the service chain as well as the service chain such that the latencies are met. In addition, the one or more service chains are executed contemporaneously.

According to another aspect, the method may perform the following steps for each service chain. First, the method may include determining a statistical distribution of a workload for each service of that chain based on computational resource shares and current execution times for the services of that chain for a current execution of that chain. Second, the method may include allocating computational resource shares for the services of that chain for a next execution of that chain based on the statistical distributions and the estimated and predetermined tail latencies of that chain.

According to another aspect, the method may include determining the statistical distribution of the workload for each service of that chain which is further based on a processing capacity of a corresponding processor.

According to another aspect, the statistical distribution of the workload for each service of one chain may be represented by $P(T_{i,j,k} \le t)$ as follows:

$$P(T_{i,j,k} \le t) = P\left(\frac{W_{i,j}}{E|\Phi_{i,j,k}|C_k} \le t\right) = F_{W_{i,j}}(tE|\Phi_{i,j,k}|C_k),$$

where $T_{i,j,k}$ is an execution time of the unique sequential service j of the service chain i on processor k, t is time, $W_{i,j}$ is a workload of the service j of the chain i, $\Phi_{i,j,k}$ is a computational resource share of the service j of the chain i for processor k, $E|\Phi_{i,j,k}|$ is an expected computational resource share of the service j of the chain i for processor k, $C_k$ is a processing capacity of processor k, and $F_{W_{i,j}}(tE|\Phi_{i,j,k}|C_k)$ represents a cumulative density function of $T_{i,j,k}$ expressed by the corresponding workload $W_{i,j}$.

According to another aspect, the method may perform the following steps for each service chain. First, the method may include determining candidate computational resource shares of available computational resource shares for the services of that chain based on the statistical distributions. Second, the method may include determining the estimated tail latency of that chain based on the candidate shares of that chain and an average execution time of that chain. Third, the method may include evaluating whether to use the candidate shares of that chain as the next shares for that chain based on the estimated and predetermined tail latencies of that chain.

According to another aspect, the allocating step may include determining the average execution time of that chain and each sequential service in that chain based on an idle time and a probability that such chain is idle. Further, the evaluating step may also be based on the average executing time of that chain.

According to another aspect, the average execution time of one chain may be represented by $E|T_i|$ as follows:

$$E|T_i| = \lambda_i^{-1} \frac{1 - p_{idle,i}}{p_{idle,i}},$$

where $E|T_i|$ is an average execution time of chain i, $\lambda_i^{-1}$ is an idle time of chain i, and $p_{idle,i}$ is a probability that chain i is idle.

According to another aspect, the method may include determining the estimated tail latency of one chain by evaluating the chains using a Markov process.

According to another aspect, the method may perform the following additional step for each service chain. The method may include determining an estimated latency for each service of that chain based on the candidate shares of that chain. Further, the method may include evaluating whether to use the candidate shares of that chain as the next shares for that chain also based on the latencies of the services of that chain.

According to another aspect, the method may include estimating the latency for each service of a chain by evaluating the services of that chain using a Markov process.

According to another aspect, the services of at least one of the chains may be associated with a control loop of the remote application.

According to another aspect, the controller may be operationally coupled to the one or more processors via a network such as a wired network or a wireless network.

According to another aspect, the controller may be operationally coupled to the one or more processors via an electrical bus.

According to another aspect, all of the services of a chain may be executed during a current execution of that chain prior to any service of that chain being executed during a next execution of that chain.

According to another aspect, each service of a chain may be executed only once during each execution of that chain.

According to another aspect, one service of that chain may not execute contemporaneous with another service of that chain.

According to another aspect, the one or more processors may be operationally coupled to the remote application via a network such as a wired network or a wireless network.

According to another aspect, a sum of the average execution times of the services of that chain may be no more than the average execution time of that chain.

According to another aspect, a controller for managing computational resources may include a resource distributor circuit. The resource distributor circuit may be configured to dynamically distribute computational resource shares among sequential services that are mapped to one or more processors. Each sequential service may correspond to an execution step of a remote application. Also, a service chain may include at least one sequential service. The dynamical distribution is based on estimated and predetermined tail latencies and average execution times of each sequential service in the service chain as well as the service chain such that the latencies are met. In addition, the one or more service chains may be executed contemporaneously.

According to another aspect, the resource distributor circuit may include a resource distribution determination circuit and a resource allocation circuit. The resource distribution determination circuit may be configured to determine, for each chain, a statistical distribution of a workload for each service of that chain based on computational resource shares and execution times for the services of that chain for a current execution of that chain. The resource allocation circuit may be configured to allocate, for each chain, computational resource shares for the services of that chain for a next execution of that chain based on the statistical distributions and the estimated and predetermined tail latencies of that chain.

According to another aspect, the resource distribution determination circuit may be further configured to determine, for each chain, the statistical distribution of the workload for each service of that chain based also on a processing capacity of a corresponding processor.

According to another aspect, the resource allocation circuit may include a candidate share determination circuit, a tail latency estimation circuit and a candidate share evaluation circuit. The candidate share determination circuit may be configured to determine candidate computational resource shares of available computational resource shares for the services of that chain based on the statistical distributions. The tail latency estimation circuit may be configured to determine the estimated tail latency of that chain based on the candidate shares of that chain and an average execution time of that chain. The candidate share evaluation circuit may be configured to evaluate whether to use the candidate shares of that chain as the next shares for that chain based on the estimated and predetermined tail latencies of that chain.

According to another aspect, the resource allocation circuit may include an average execution time determination circuit that is configured to determine the average execution time of that chain based on an idle time and a probability that such chain is idle. Further, the candidate share evaluation circuit may be further configured to evaluate whether to use the candidate shares of that chain as the next shares for that chain based on the average execution time of that chain.

According to another aspect, the tail latency estimation circuit may be further configured to evaluate the chains using a Markov process.

According to another aspect, the resource allocation circuit may further include a service latency estimation circuit. The service latency estimation circuit may be configured to determine an estimated latency for each service of that chain based on the candidate shares of that chain. Also, the candidate share evaluation circuit may be further configured to evaluate whether to use the candidate shares of that chain as the next shares for that chain also based on the latencies of the services of that chain.

According to another aspect, the service latency evaluation circuit being further configured to evaluate the services of that chain using a Markov process.

According to another aspect, a controller for managing computational resources may be configured to dynamically distribute computational resource shares among sequential services that are mapped to one or more processors. Each sequential service may correspond to an execution step of a remote application. Further, a service chain may include at least one sequential service. The dynamical distribution is based on estimated and predetermined tail latencies and average execution times of each sequential service in the service chain as well as the service chain such that the latencies are met. Also, the one or more service chains may be executed contemporaneously.

According to another aspect, a controller for managing computational resources may include a processor and a memory, the memory containing instructions executable by the processor whereby the controller may be configured to dynamically distribute computational resource shares among sequential services that are mapped to one or more processors. Each sequential service corresponds to an execution step of a remote application. Further, a service chain may include at least one sequential service. The dynamical distribution is based on estimated and predetermined tail latencies and average execution times of each sequential service in the service chain as well as the service chain such that the latencies are met. Also, the one or more service chains may be executed contemporaneously.

According to another aspect, a computer program, including instructions which, when executed on at least one processor of a controller, cause the at least one processor to carry out the method according to any of the embodiments described herein.

According to another aspect, a carrier containing the computer program corresponding to any of the embodiments described herein, wherein the carrier is one of an electronic signal, optical signal, radio signal, or computer readable storage medium.

According to another aspect, a controller for managing computational resources may include a resource distributing module. The resource distributing module may include dynamically distributing computational resource shares among sequential services that are mapped to one or more processors. Each sequential service may correspond to an execution step of a remote application. Further, a service chain may include at least one sequential service. The dynamical distribution is based on estimated and predetermined tail latencies and average execution times of each sequential service in the service chain as well as the service chain such that the latencies are met. Also, the one or more service chains are executed contemporaneously.

According to another aspect, the resource distributing module may include a resource distribution determining module and a resource allocating module. The resource distribution determining module may include determining, for each chain, a statistical distribution of a workload for each service of that chain based on computational resource shares and current execution times for the services of that chain for a current execution of that chain. Further, the resource allocating module may include allocating, for each chain, computational resource shares for the services of that chain for a next execution of that chain based on the statistical distributions and the estimated and predetermined tail latencies of that chain.

According to another aspect, the distribution determining module may include determining, for each chain, the statistical distribution of the workload for each service of that chain based also on a processing capacity of a corresponding processor.

According to another aspect, the resource allocating module may include a candidate share determining module, a tail latency estimating module and a candidate share evaluating module. The candidate share determining module may include determining candidate computational resource shares of available computational resource shares for the services of that chain based on the statistical distributions. The tail latency estimating module may include determining the estimated tail latency of that chain based on the candidate shares of that chain and an average execution time of that chain. The candidate share evaluating module may include evaluating whether to use the candidate shares of that chain as the next shares for that chain based on the estimated and predetermined tail latencies of that chain.

According to another aspect, the resource allocation module may include an average execution time determining module for determining the average execution time of that chain based on an idle time and a probability that such chain is idle. Further, the candidate share evaluating module may include evaluating whether to use the candidate shares of that chain as the next shared for that chain based on the average execution time of that chain.

According to another aspect, the tail latency estimation module may evaluate the chains using a Markov process.

According to another aspect, the resource allocation module may further include a service latency estimating module. The service latency estimating module may include estimating a latency for each service of that chain based on the candidate shares of that chain. Further, the candidate share evaluating module may include evaluating whether to use the candidate shares of that chain as the next shares for that chain based on the latencies of the services of that chain.

According to another aspect, the service latency evaluation module may include evaluating the services of that chain using a Markov process.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 8 illustrates one embodiment of a method for managing computational resources in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 2:
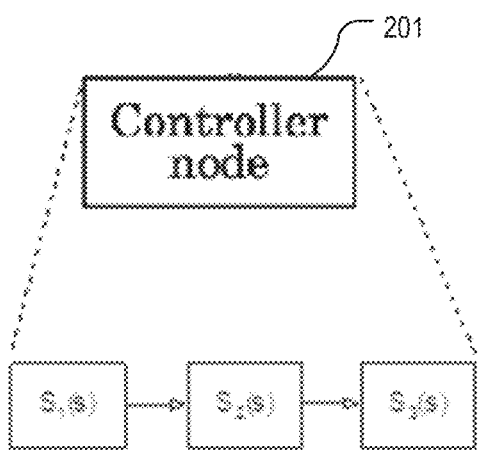
FIG. 2 illustrates one embodiment of a controller node having a session chain having one or more sessions in accordance with various aspects as described herein.
Figure 12:
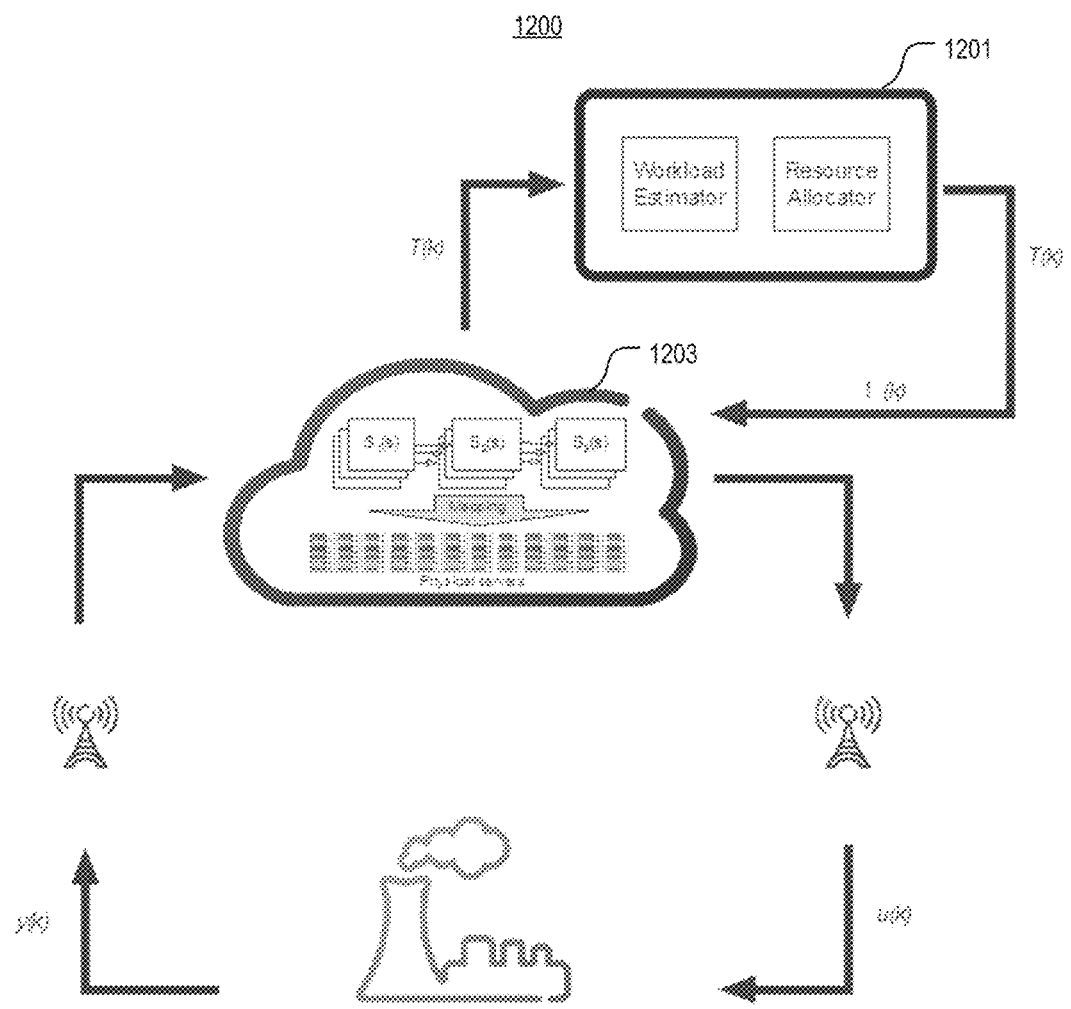
FIG. 12 illustrates another embodiment of a system for managing computational resources in accordance with various aspects as described herein.

Cloud providers of today give few or no guarantees with respect to latency and timing in general. While this may not pose a problem from Information Technology (IT) applications, latency and timing are typically challenging issues for industrial automation and network processing. FIG. 2 shows a controller node 201 having a set of functions that are chained together. In a cloud setting, these chained functions correspond to a session chain having one or more sessions $S_i(s)$. For instance. FIG. 12 illustrates a cloud based factory 1200 as an example of a mission critical cloud. For this application, a controller node 1201 executes on a cloud platform 1203. Further, compute resources are provided by physical servers. The services $S_i(s)$ are assigned shares $\phi(k)$ of the available compute power and mapped onto the physical hardware.

Figure 3:
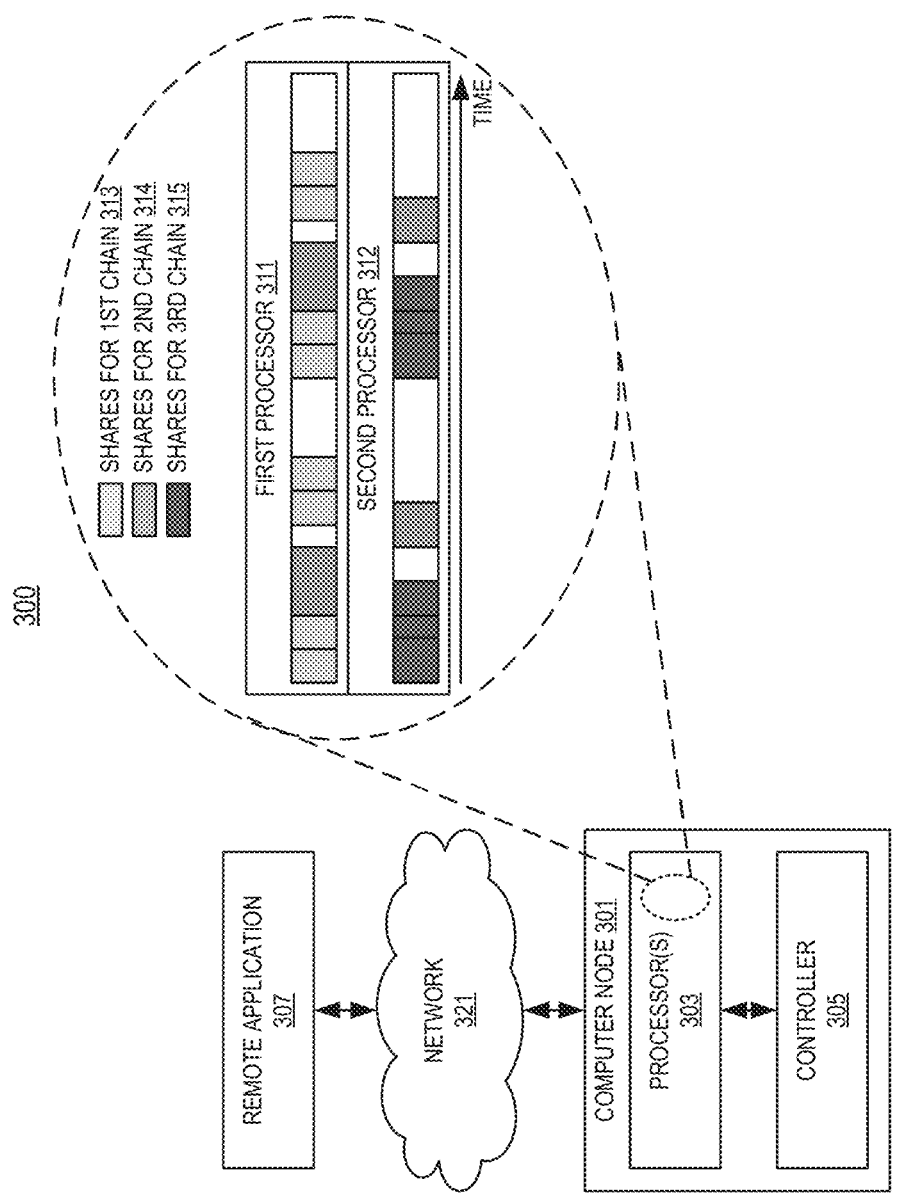
FIG. 3 illustrates one embodiment of a system for managing computational resources in accordance with various aspects as described herein.

As such, this disclosure describes, among other things, a mechanism to dynamically adjust the computing shares $\phi(k)$ of the different services $S_i(s)$. For example, FIG. 3 illustrates one embodiment of a system 300 for managing computational resources in accordance with various aspects as described herein. In FIG. 3, the system 300 includes a computer node 301 having one or more processors 303 (e.g., first and second processors 311, 312) and a controller 305. The computer node 301 communicates with a remote application 307 via a network 321 such as a wired or wireless network. The controller 305 manages computational resources of the one or more processors 303 by dynamically distributing the computational resource shares among sequential services that are mapped to the one or more processors 303 based on estimated and predetermined tail latencies and an average execution time of each sequential service in a service chain 313, 314, 315 as well as the service chain 313, 314, 315 such that the latencies are met. Each sequential service corresponds to an execution step of the remote application 307. Further, each service chain 313, 314, 315 is executed contemporaneously with the other service chains and includes at least one sequential service.

Figure 4:
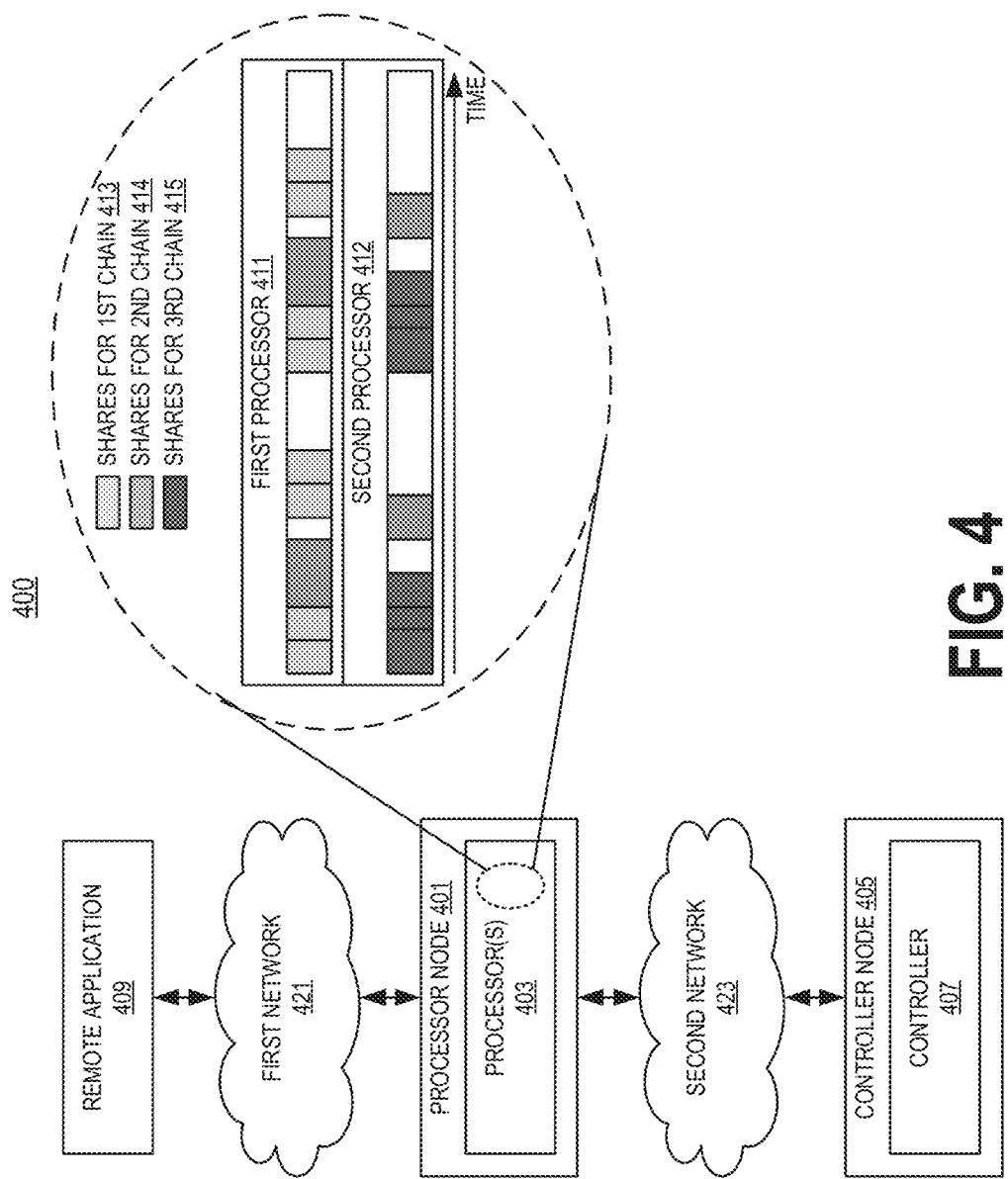
FIG. 4 illustrates another embodiment of a system for managing computational resources in accordance with various aspects as described herein.

FIG. 4 illustrates another embodiment of a system 400 for managing computational resources in accordance with various aspects as described herein. In FIG. 4, the system 400 includes a controller node 401 having a controller 407, a processor node 401 having one or more processors 403 (e.g., first and second processors 411, 412), a remote application 409, and first and second networks 421, 423. Each of the first and second networks 421, 423 may be a wired or wireless network. The controller node 405 communicates with the processor node 401 via the network 423. Further, the processor node 401 communicates with the remote application 409 via the network 421. The controller 407 remotely manages computational resources of the one or more processors 403 by dynamically distributing the computational resource shares among sequential services that are mapped to the one or more processors 403 based on estimated and predetermined tail latencies and an average execution time of each sequential service in a service chain 413, 414, 415 as well as the service chain 413, 414, 415 such that the latencies are met. Each sequential service corresponds to an execution step of the remote application 409. Further, each service chain 413, 414, 415 is executed contemporaneously with the other service chains 413, 414, 415 and includes at least one sequential service.

Figure 5:
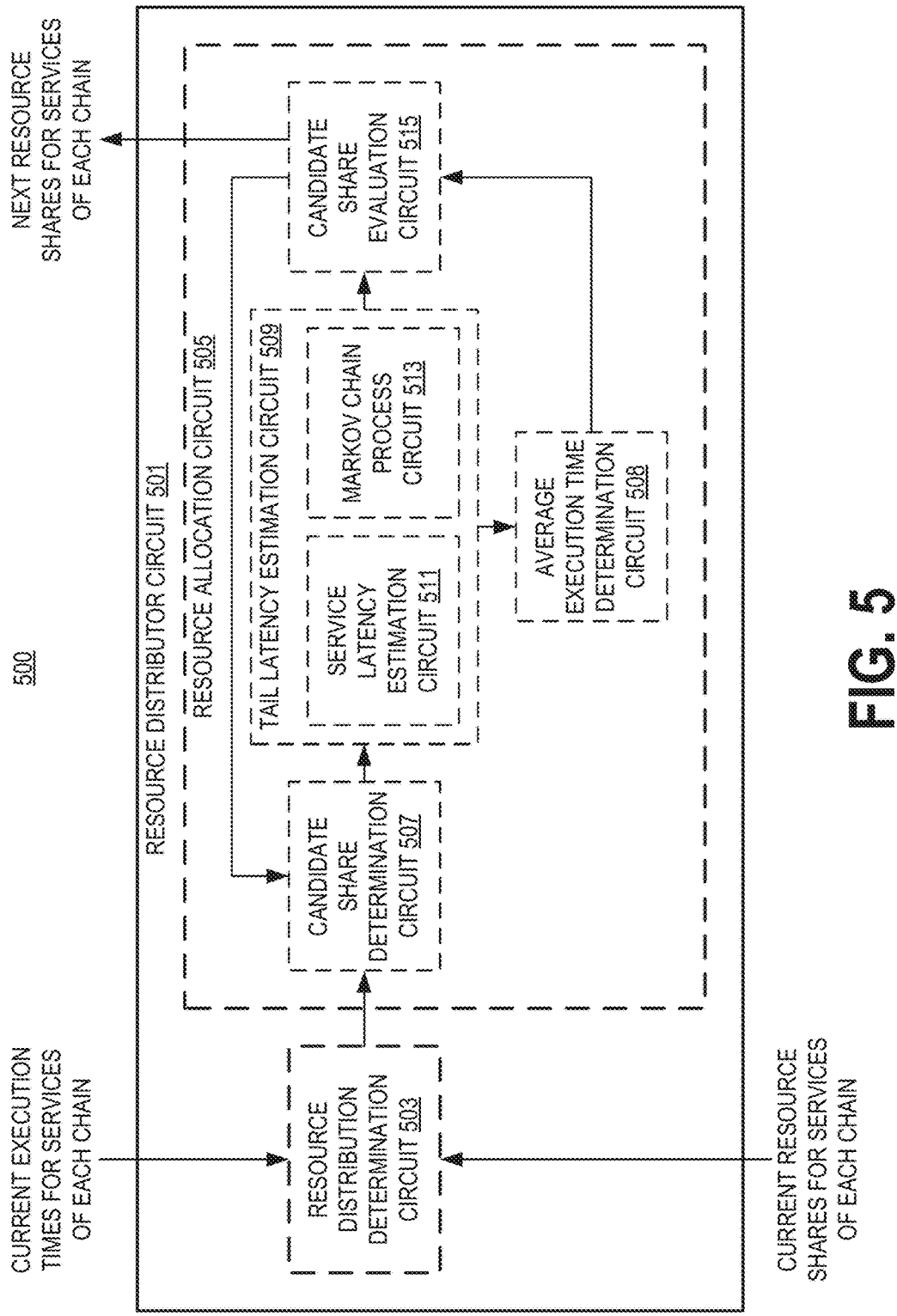
FIG. 5 illustrates one embodiment of a controller for managing computational resources in accordance with various aspects as described herein.

FIG. 5 illustrates one embodiment of a controller 500 for managing computational resources in accordance with various aspects as described herein. In FIG. 5, the controller 500 includes a resource distributor circuit 501 that is configured to dynamically distribute computational resource shares among sequential services that are mapped to one or more processors based on estimated and predetermined tail latencies and an average execution time of each sequential service in a service chain as well as the service chain such that the latencies are met. Further, each sequential service corresponds to an execution step of a remote application.

Also, each service chain is executed contemporaneously with the other service chains and includes at least one sequential service.

In FIG. 5, the resource distributor circuit 501 may include a resource distribution determination circuit 503 and a resource allocation circuit 505. The resource distribution determination circuit 503 may be configured to determine a statistical distribution of a workload for each service of that chain based on computational resource shares and current execution times for the services of that chain for a current execution of that chain. Further, the resource allocation circuit 505 may be configured to allocate computational resource shares for the services of that chain for a next execution of that chain based on the statistical distributions, the estimated and predetermined tail latencies, and the average execution time of the services of that chain and the chain itself.

Furthermore, the resource allocation circuit 505 may include a candidate share determination circuit 507, an average execution time determination circuit 508, a tail latency estimation circuit 511, and a candidate share evaluation circuit 515. The candidate share determination circuit 507 may be configured to determine candidate computational resource shares of available computational resource shares for the services of that chain based on the statistical distributions. The average execution time determination circuit 508 may be configured to determine the average execution time of that chain and each sequential service in that chain based on an idle time and a probability that such chain is idle. The tail latency estimation circuit 511 may be configured to determine the estimated tail latency of that chain based on the candidate shares of that chain and the average execution time of that chain. The candidate share evaluation circuit 515 may be configured to evaluate whether to use the candidate shares of that chain as the next shares for that chain based on the estimated and predetermined tail latencies of that chain, and the average execution time of that chain.

Moreover, the tail latency estimation circuit 509 may include a service latency estimation circuit 511 and a Markov chain process circuit 513. The service latency estimation circuit 511 may be configured to estimate a latency for each service of that chain based on the candidate shares of that chain. Further, the Markov chain process circuit 513 may be configured to evaluate the services of that chain using a Markov process.

Figure 6:
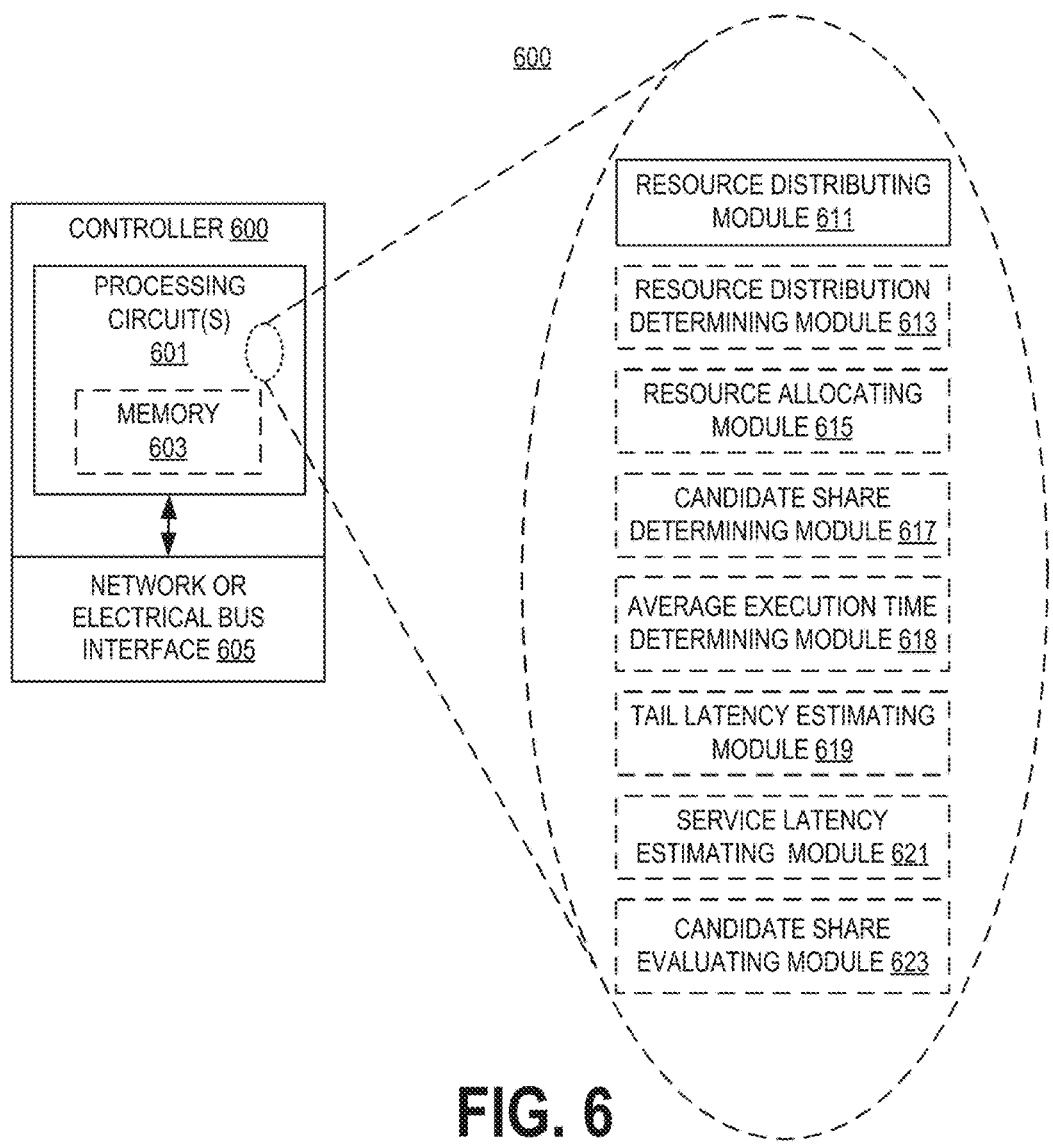
FIG. 6 illustrates another embodiment of a controller for managing computational resources in accordance with various aspects as described herein.

FIG. 6 illustrates another embodiment of a controller node 600 for managing computational resources in accordance with various aspects as described herein. In FIG. 6, the controller 600 may include processing circuit(s) 601, network or electrical bus interface circuit(s) 605, the like, or any combination thereof. The network or electrical bus interface circuit(s) 605 may be configured to transmit or receive information to or from one or more processors via an electrical bus or a network using any communication technology. The processing circuit(s) 601 may be configured to perform processing as described herein (e.g., the methods of FIGS. 8-10, and 24-25) such as by executing program instructions stored in memory 603. The processing circuit(s) 601 in this regard may implement certain functional means, units, or modules.

In FIG. 6, the controller 600 may implement various functional means, units, or modules (e.g., via the processing circuit(s) 601 or via software code). These functional means, units, or modules (e.g., for implementing the methods of FIGS. 8-10, and 24-25) include a resource distributing module or unit 611 for dynamically distributing computational resource shares among sequential services that are mapped to one or more processors based on estimated and predetermined tail latencies and an average execution time of each sequential service in the service chain as well as the service chain such that the latencies are met. Further, each sequential service corresponds to an execution step of a remote application. Also, each service chain is executed contemporaneously with any other service chains and comprises at least one sequential service. In addition, these functional means, units, or modules may include a resource distribution determining module or unit 613 for determining a statistical distribution of a workload for each service of that chain based on computational resource shares and current execution times for the services of that chain for a current execution of that chain. Also, these functional means, units, or modules may include a resource allocating module or unit 615 for allocating computational resource shares for the services of that chain for a next execution of that chain based on the statistical distributions, the estimated and predetermined tail latencies, and the average execution times of the services of that chain and that chain itself.

In FIG. 6, these functional means, units, or modules may include a candidate share determining module or unit 617 for determining candidate computational resource shares of available computational resource shares for the services of that chain based on the statistical distributions. Further, these functional means, units, or modules may include an average execution time determining module or unit 618 for determining the average execution time of that chain and each sequential service in that chain based on an idle time and a probability that such chain is idle. Also, these functional means, units, or modules may include a tail latency estimating module or unit 619 for determining the estimated tail latency of that chain based on the candidate shares of that chain and an average execution time of that chain. In addition, these functional means, units, or modules may include a service latency estimating module or unit 621 for determining an estimated latency for each service of that chain based on the candidate shares of that chain. Finally, these functional means, units, or modules may include a candidate share evaluating module or unit 623 for evaluating whether to use the candidate shares of that chain as the next shares for that chain based on the estimated and predetermined tail latencies, and the average execution times of the services of that chain and that chain itself.

Figure 7:
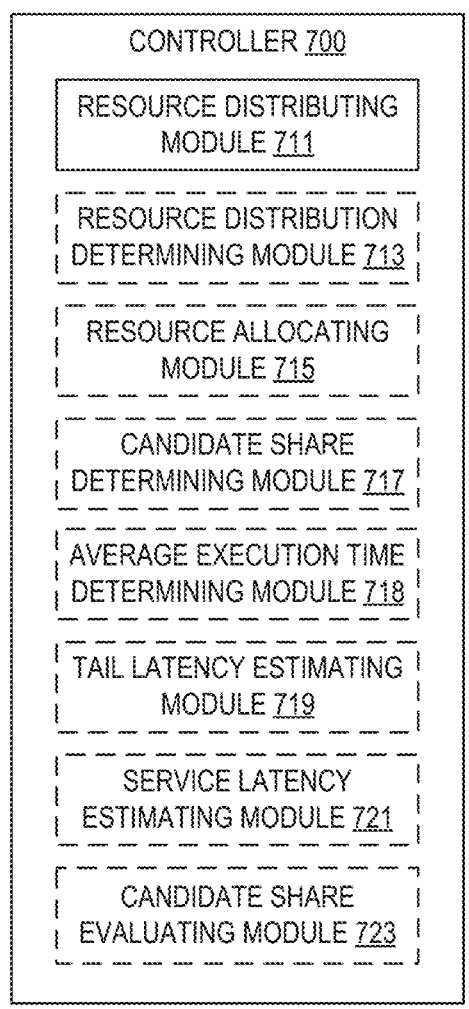
FIG. 7 illustrates another embodiment of a controller for managing computational resources in accordance with various aspects as described herein.

FIG. 7 illustrates another embodiment of a controller 700 for managing computational resources in accordance with various aspects as described herein. In FIG. 7, the controller 700 may implement various functional means, units, or modules (e.g., via the processing circuit(s) 601 in FIG. 6 or via software code). These functional means, units, or modules (e.g., for implementing the methods of FIGS. 8-10, and 24-25) include a resource distributing module or unit 711 for dynamically distributing computational resource shares among sequential services that are mapped to one or more processors based on estimated and predetermined tail latencies and an average execution time of each sequential service in the service chain as well as the service chain such that the latencies are met. Further, each sequential service corresponds to an execution step of a remote application. Also, each service chain is executed contemporaneously with any other service chains and comprises at least one sequential service. In addition, these functional means, units, or modules may include a resource distribution determining module or unit 713 for determining a statistical distribution of a workload for each service of that chain based on computational resource shares and current execution times for the services of that chain for a current execution of that chain. Also, these functional means, units, or modules may include a resource allocating module or unit 715 for allocating computational resource shares for the services of that chain for a next execution of that chain based on the statistical distributions, the estimated and predetermined tail latencies, and the average execution times of the services of that chain and that chain itself.

In FIG. 7, these functional means, units, or modules may include a candidate share determining module or unit 717 for determining candidate computational resource shares of available computational resource shares for the services of that chain based on the statistical distributions. Further, these functional means, units, or modules may include an average execution time determining module or unit 718 for determining the average execution time of that chain and each sequential service in that chain based on an idle time and a probability that such chain is idle. Also, these functional means, units, or modules may include a tail latency estimating module or unit 719 for determining the estimated tail latency of that chain based on the candidate shares of that chain and the average execution time of that chain. In addition, these functional means, units, or modules may include a service latency estimating module or unit 721 for determining an estimated latency for each service of that chain based on the candidate shares of that chain. Finally, these functional means, units, or modules may include a candidate share evaluating module or unit 723 for evaluating whether to use the candidate shares of that chain as the next shares for that chain based on the estimated and predetermined tail latencies, and the average execution times of the services of that chain and that chain itself.

FIG. 8 illustrates one embodiment of a method 800 for managing computational resources in accordance with various aspects as described herein. In FIG. 8, at block 801, the method 800 includes dynamically distributing computational resource shares among sequential services that are mapped to one or more processors based on estimated and predetermined tail latencies and average execution times of each sequential service in the service chain as well as the service chain such that the latencies are met. Each sequential service may correspond to an execution step of a remote application. Further, a service chain may include at least one sequential service. In addition, the one or more service chains may be executed contemporaneously.

Figure 9:
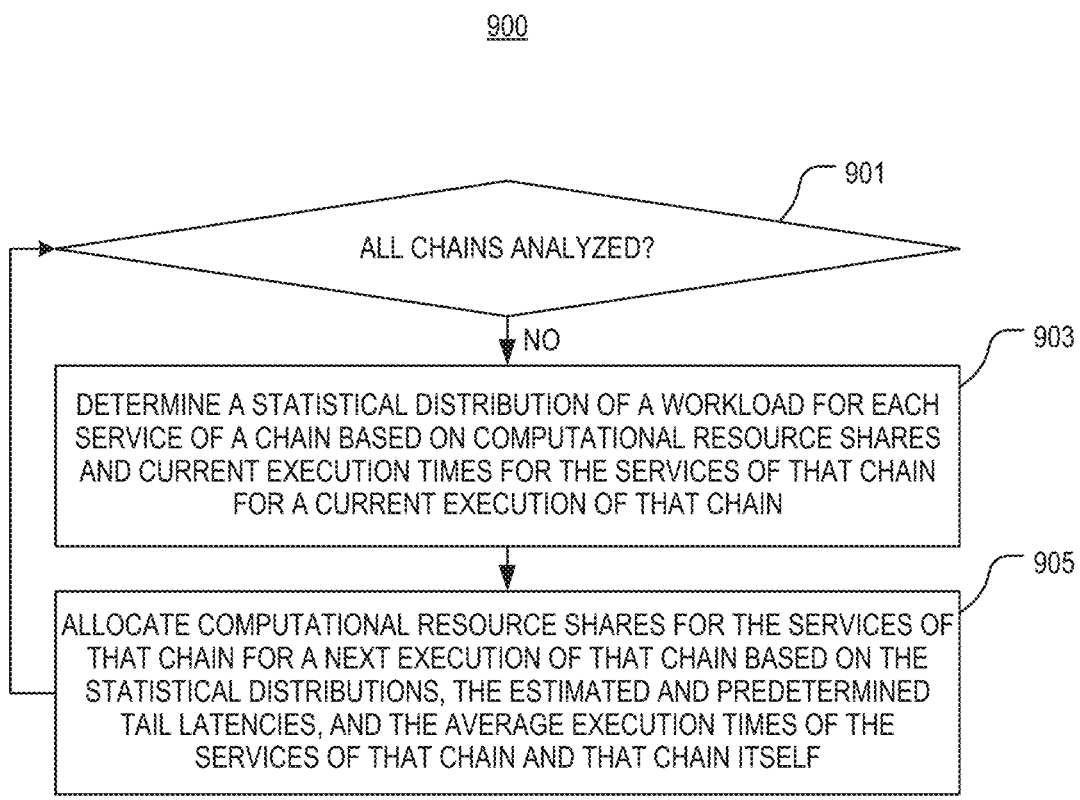
FIG. 9 illustrates another embodiment of a method for managing computational resources in accordance with various aspects as described herein.
Figure 24:
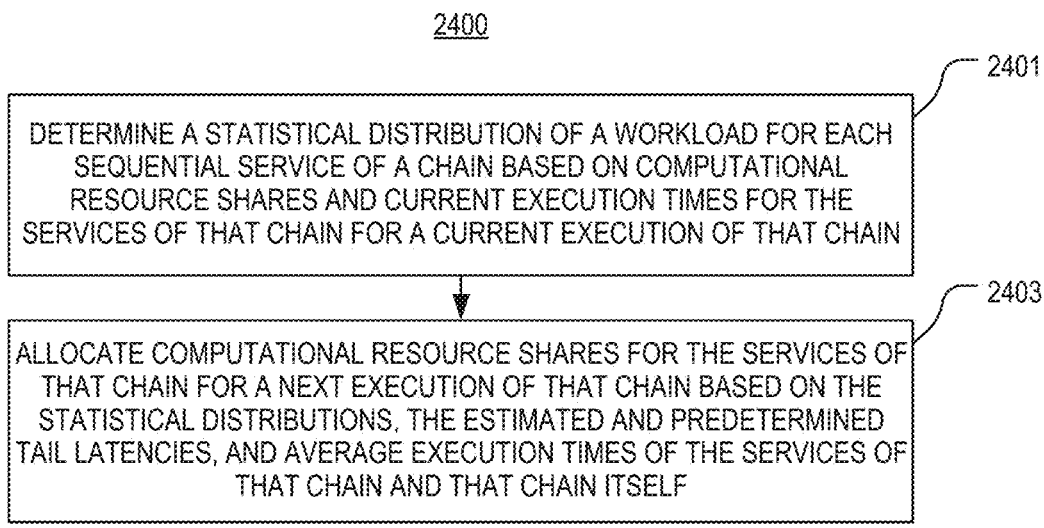
FIG. 24 illustrates another embodiment of a method for managing computational resources in accordance with various aspects as described herein.
Figure 25:
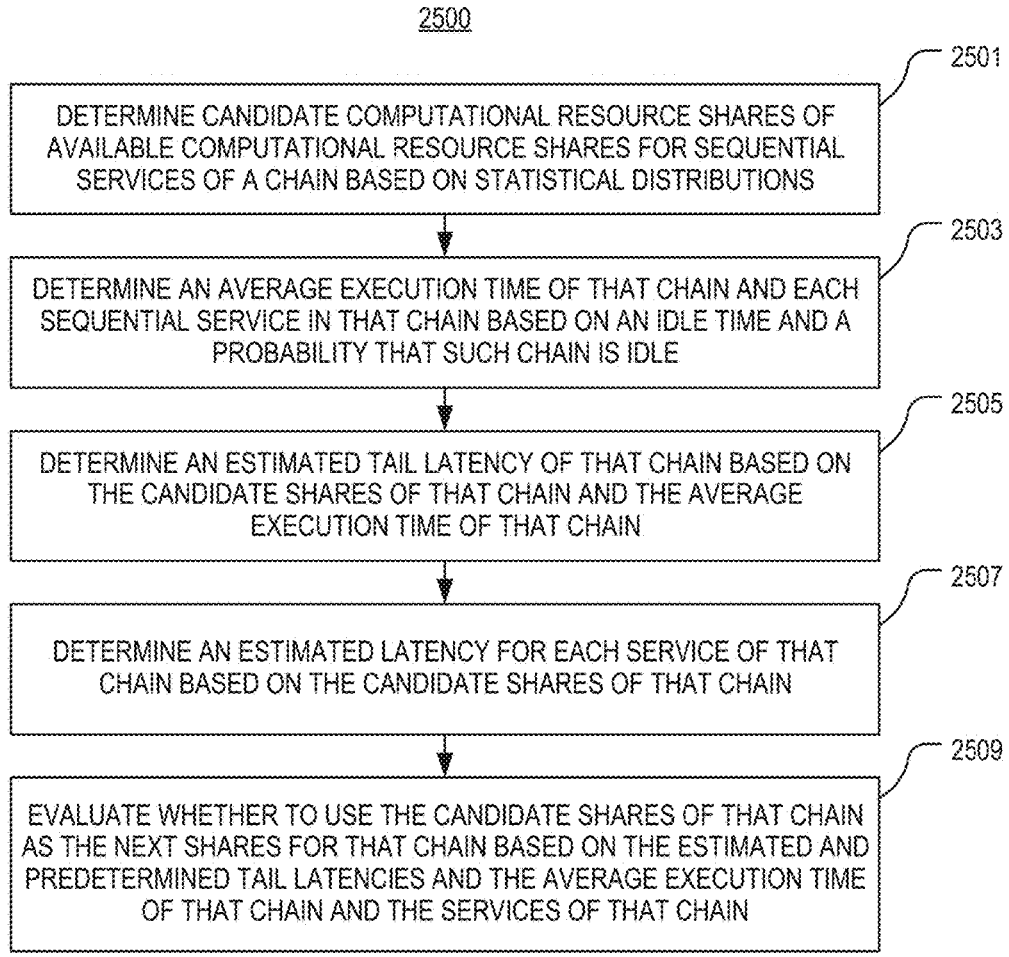
FIG. 25 illustrates another embodiment of a method for managing computational resources in accordance with various aspects as described herein.

FIG. 24 illustrates another embodiment of a method 2400 performed by a controller for managing computational resources in accordance with various aspects as described herein. In FIG. 24, the method 2400 may start, for instance, at block 2401, where it may include determining a statistical distribution of a workload for each service of a chain based on computational resource shares and current execution times for the services of that chain for a current execution of that chain. Further, the method 2400 may include allocating computational resource shares for the services of that chain for a next execution of that chain based on the statistical distributions and the estimated and predetermined tail latencies of that chain FIG. 25 illustrates another embodiment of a method 2500 performed by a controller for managing computational resources in accordance with various aspects as described herein. In FIG. 25, the method 2500 may start, for instance, at block 2501, where it may include determining candidate computational resource shares of available computational resource shares for services of a chain based on the statistical distributions. At block 2503, the method 2500 may include determining the average execution time of that chain and each sequential service in that chain based on an idle time and a probability that such chain is idle. At block 2505, the method 2500 may include determining the estimated tail latency of that chain based on the candidate shares of that chain and the average execution time of that chain. At block 2507, the method 2500 may include determining an estimated latency for each service of that chain based on the candidate shares of that chain. At block 2509, the method 2500 may include evaluating whether to use the candidate shares of that chain as the next shares for that chain based on the estimated and predetermined tail latencies and the average execution time of that chain and the services of that chain FIG. 9 illustrates another embodiment of a method 900 for managing computational resources in accordance with various aspects as described herein. The method 900 may start, for instance, at block 901 where it may include determining whether all service chains have been analyzed. If not, the method 900 may proceed to the next chain to be analyzed. At block 903, the method 900 may include determining a statistical distribution of a workload for each service of the next chain to be analyzed based on computational resource shares and current execution times for the services of that chain for a current execution of that chain. Further, at block 905, the method 900 may include allocating computational resource shares for the services of that chain for a next execution of that chain based on the statistical distributions and the estimated and predetermined tail latencies and average execution times of the services of that chain and the chain itself. After the method 900 performs the functions of block 905, the method 900 may return to block 901, where it again determines whether all service chains have been analyzed.

Figure 10:
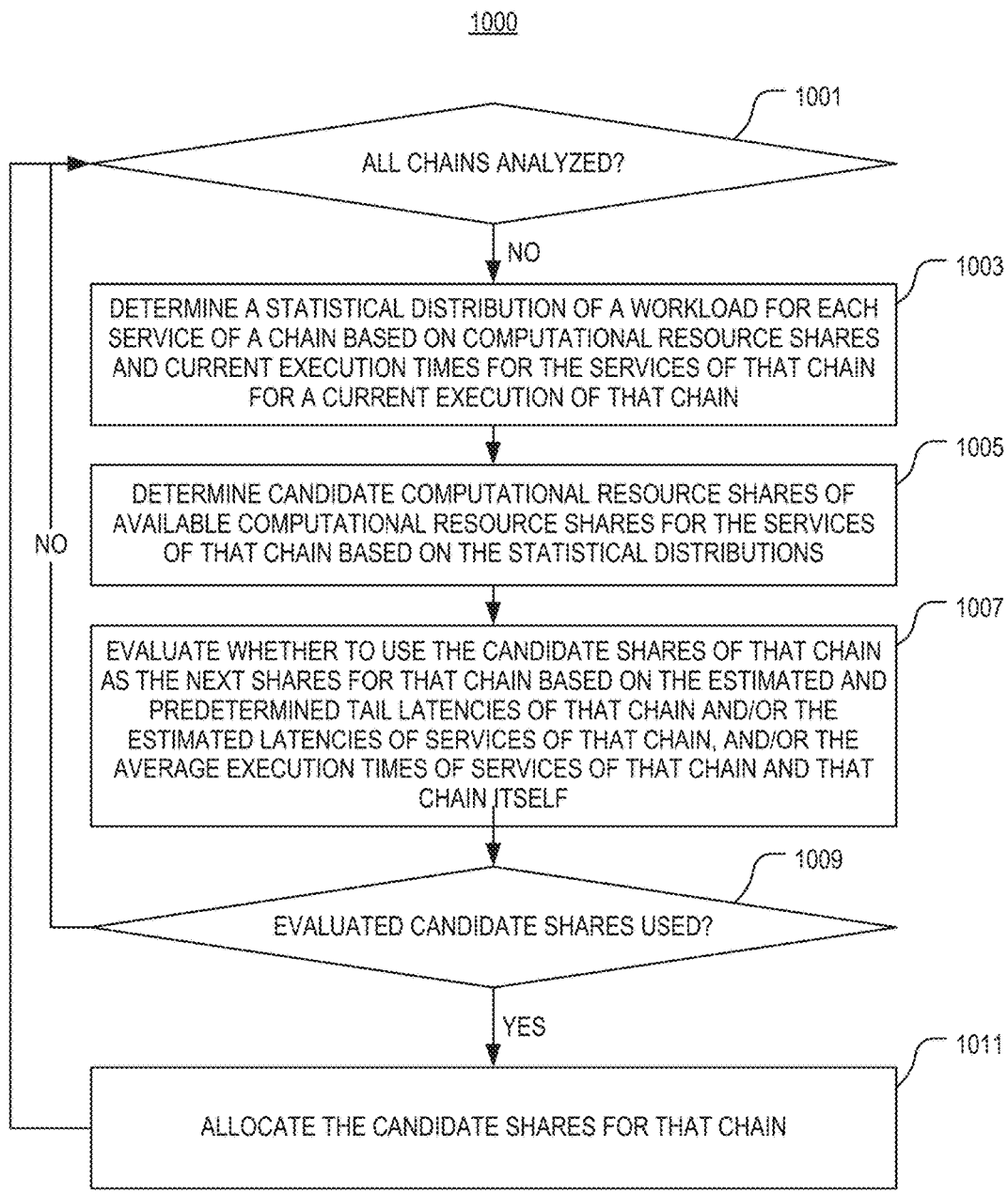
FIG. 10 illustrates another embodiment of a method for managing computational resources in accordance with various aspects as described herein.

FIG. 10 illustrates another embodiment of a method 1000 for managing computational resources in accordance with various aspects as described herein. The method 1000 may start, for instance, at block 1001 where it may include determining whether all service chains have been analyzed. If not, the method 1000 may proceed to the next chain to be analyzed. At block 1003, the method 1000 may include determining a statistical distribution of a workload for each service of that chain based on computational resource shares and current execution times for the services of that chain for a current execution of that chain. At block 1005, the method 1000 may include determining candidate computational resource shares of available computational resource shares for the services of that chain based on the statistical distributions. At block 1007, the method 1000 may include evaluating whether to use the candidate shares of that chain as the next shares for that chain based on the estimated and predetermined tail latencies of that chain and the estimated latencies of services of that chain. At block 1009, the method 1000 may include determining whether the evaluated candidate shares are used. If so, at block 1011, the method 1000 may include allocating the candidate shares for that chain. Otherwise, the method 1000 may return to block 1001 to determine whether all chains have been analyzed.

Figure 11:
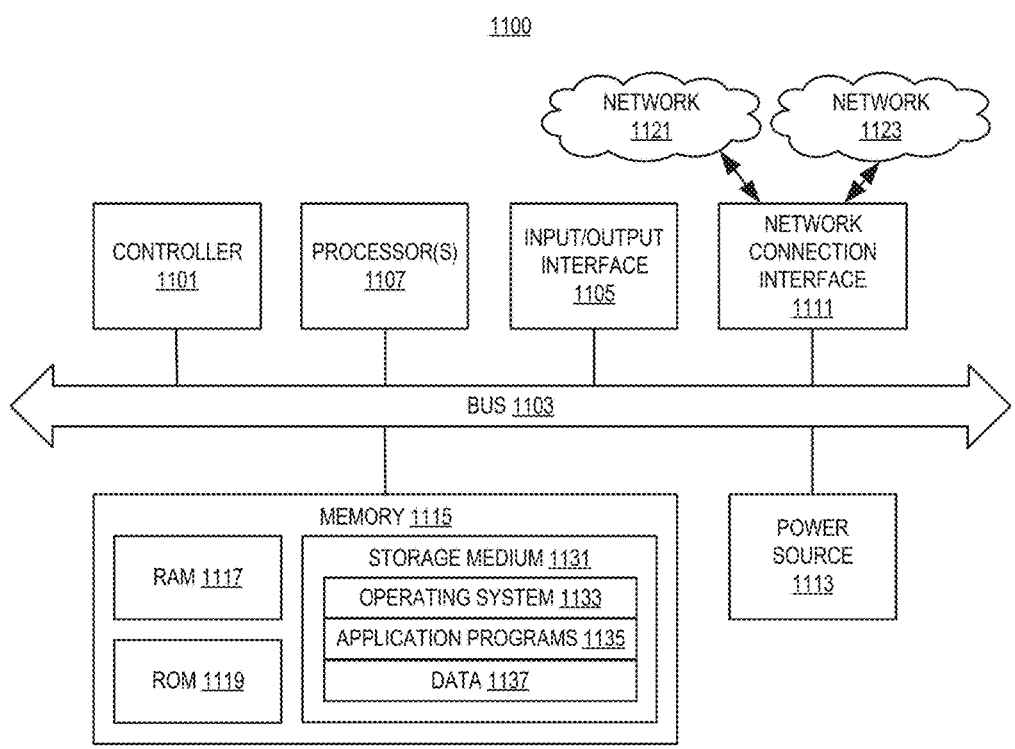
FIG. 11 illustrates another embodiment of a controller for managing computational resources in accordance with various aspects as described herein.

FIG. 11 illustrates another embodiment of a controller node 1100 for managing computational resources in accordance with various aspects as described herein. In some instances, the controller node 1100 may be referred as a network node, a server, a radio node, or some other like terminology. In other instances, the controller node 1100 may be a set of hardware components. In FIG. 11, the controller node 1100 may be configured to include a controller 1101 that is operatively coupled to an input/output interface 1105, one or more processors 1107, a network connection interface 1111, a memory 1115 including a random access memory (RAM) 1117, a read only memory (ROM) 1119, a storage medium 1131 or the like, a power source 1133, another component, or any combination thereof. The storage medium 1131 may include an operating system 1123, an application program 1125, data 1127, or the like. Specific devices may utilize all of the components shown in FIG. 11, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory. The power source 1113 may be configured to provide an alternating current (AC) or direct current (DC) power to components of the controller node 1100.

In FIG. 11, the controller 1101 may be configured to process computer instructions and data. The controller 1101 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the controller 1101 may include two computer processors. In one definition, data is information in a form suitable for use by a computer. It is important to note that a person having ordinary skill in the art will recognize that the subject matter of this disclosure may be implemented using various operating systems or combinations of operating systems. The one or more processors 1107 may be configured to process computer instructions and data. Further, the one or more processors 1107 may be configured to allow the controller 1101 to dynamically distribute computational resource shares among sequential services that are mapped to the one or more processors 1107. The one or more processors may also be operatively coupled to the input/output interface 1105, the network connection interface 1111, the memory 1115 including the RAM 1117, the ROM 1119, the storage medium 1131 or the like, the power source 1133, another component, or any combination thereof.

In the current embodiment, the input/output interface 1105 may be configured to provide a communication interface to an input device, output device, or input and output device. The controller node 1100 may be configured to use an output device via the input/output interface 1105. A person of ordinary skill will recognize that an output device may use the same type of interface port as an input device. For example, a USB port may be used to provide input to and output from the controller node 1100. The output device may be a speaker, a sound card, a video card, a display, a monitor, a printer, an actuator, an emitter, a smartcard, another output device, or any combination thereof. The controller node 1100 may be configured to use an input device via the input/output interface 1105 to allow a user to capture information into the controller node 1100. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, the network connection interface 1111 may be configured to provide a communication interface to a network 1121, another network 1123, or the like. Each of the networks 1121 and 1123 may encompass wired or wireless communication networks such as a local-area network (LAN), a wide-area network (WAN), a computer network, a wireless network, a telecommunications network, another like network or any combination thereof. For example, the network 1121 may be a wireless network such as IEEE 802.xx, CDMA, WCDMA, GSM, LTE, UTRAN, WiMax, NB-IoT, or the like. The network connection interface 1111 may be configured to include a receiver and a transmitter interface used to communicate with one or more other nodes over a communication network according to one or more communication protocols known in the art or that may be developed, such as Ethernet, TCP/IP, SONET. ATM, or the like. The network connection interface 1111 may implement receiver and transmitter functionality appropriate to the communication network links (e.g., wireless, optical, electrical, or the like). The transmitter and receiver functions may share circuit components, software or firmware, or alternatively may be implemented separately.

In this embodiment, the RAM 1117 may be configured to interface via the bus 1103 to the controller 1101 or the one or more processors 1107 to provide storage or caching of data or computer instructions during the execution of software programs such as the operating system, application programs, and device drivers. The ROM 1119 may be configured to provide computer instructions or data to the controller 1101 or the one or more processors 1107. For example, the ROM 1119 may be configured to be invariant low-level system code or data for basic system functions such as basic input and output (I/O), startup, or reception of keystrokes from a keyboard that are stored in a non-volatile memory. The storage medium 1131 may be configured to provide computer instructions or data to the controller 1101 or the one or more processors 1107. The storage medium 1131 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives.

Furthermore, the storage medium 1131 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1131 may allow the controller node 1100 or the one or more processors 1107 to access computer-executable instructions, application programs or the like, stored on transitory or non-transitory memory media, to off-load data, or to upload data. An article of manufacture, such as one utilizing a communication system may be tangibly embodied in the storage medium 1131, which may comprise a computer-readable medium.

Workload Estimator for Resource Management in the Mission Critical Cloud

I. Background

Cloud technology has swiftly transformed the ICT industry and it is starting to make inroads in more classical industries, such as manufacturing, mining, etc. The benefits are similar in reduced capital expenditures (CAPEX) and operating expenditures (OPEX), but the challenges are slightly different compared to many traditional ICT applications. Industrial applications have stronger requirements on timing and availability. For example, controlling a set of collaborating robots on an assembly line or vehicles in a platoon will demand tight requirements on the computation delays. In particular, we believe that the tail latencies are of special interest (i.e., the maximum response time will limit the possible performance). In order to take the cloud concepts beyond the ICT domain and apply it to mission critical use cases such as industrial automation, transport and health care, we must be able to provide guarantees and predictability performance. In this disclosure, we discuss the design of an adaptive cloud platform suitable for hosting automation and control system applications. One of the use cases is a large scale control system where signals are sampled and transmitted to the cloud, where control signals are calculated and sent back to the actuators in the plant.

We envision the control systems running in the cloud to be advanced optimization algorithms, e.g. model predictive control systems, requiring substantial compute power and with a varying execution time. In our model the processing time is described as a statistical distribution not known beforehand. The compute resources in the cloud can be dynamically shared between different control loops. The task at hand is to distribute compute resource among a set of control loops such that average and tail latencies do not violate timing requirements expressed in a service level agreements. To this end we develop a method to estimate the workload distributions and use them as input to a feedback based cloud resource manager that controls how compute power is shared.

We develop a control law that that aims at reducing the tail latency and we show how this works out for different set of simulated workload distributions.

Figure 1:
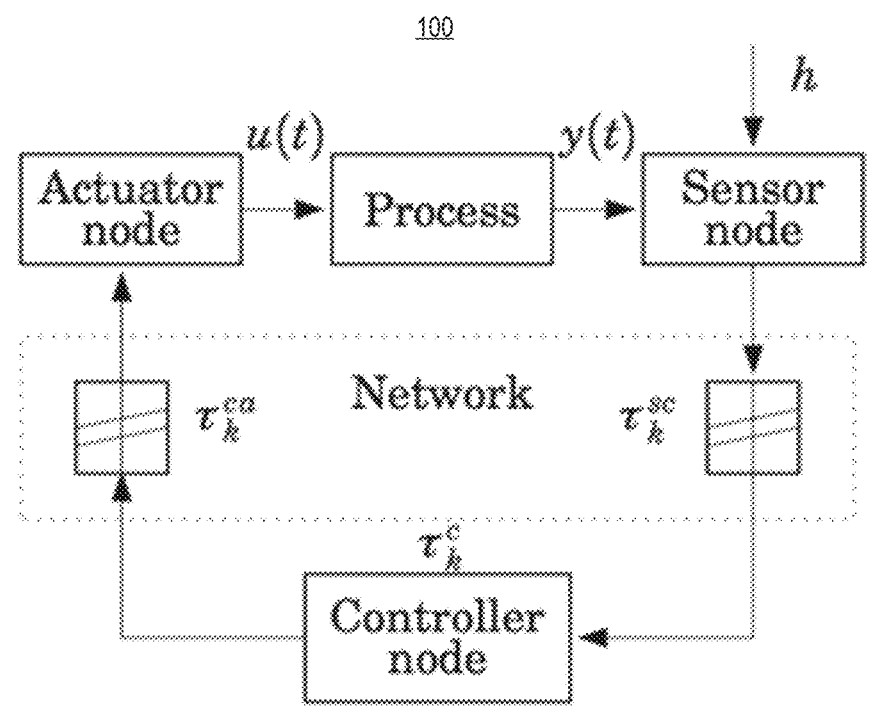
FIG. 1 illustrates a distributed control system.

Cloud providers of today give few or no guarantees with respect to latency and timing in general. This is no huge problem for IT applications, but poses challenges for industrial automation and network processing. FIG. 1 shows a distributed control system with delay. The sensor node samples the output state of the process and transmits it to the controller node where the next control signal is computed and the transmitted to the actuator node. The times delays τ influence the control performance vastly. With current 4G technology, the delays are typically in the range of thirty milliseconds (30 ms) to one hundred milliseconds (100 ms). With 5G, we expect delays to shrink to a few milliseconds or even below that.

The controller node itself commonly consists of several sub components such as state estimators, filters, etc. as illustrated in FIG. 2. In a cloud setting the subcomponents may be implemented as micro-services $S_i$, whose capacity may be scaled dynamically to meet variations in the requirements on the capacity. In a cloud setting, these functions could correspond to micro-services that are scaled vertically to dynamically provide the needed capacity.

II. Detailed Description

FIG. 12 illustrates a cloud based factory as an example of a mission critical cloud. The controller node is executing on a cloud platform. Compute resources are provided by physical servers. The services $S_i$ are assigned shares (k) of the available compute power and mapped onto the physical hardware.

This proposed solution provides a mechanism to dynamically adjust the computing shares (k) of the different services to fulfill the service level agreement that specifies an average end-to-end latency and a tail latency as a percentile (e.g., 99% with a max latency range).

Figure 13:
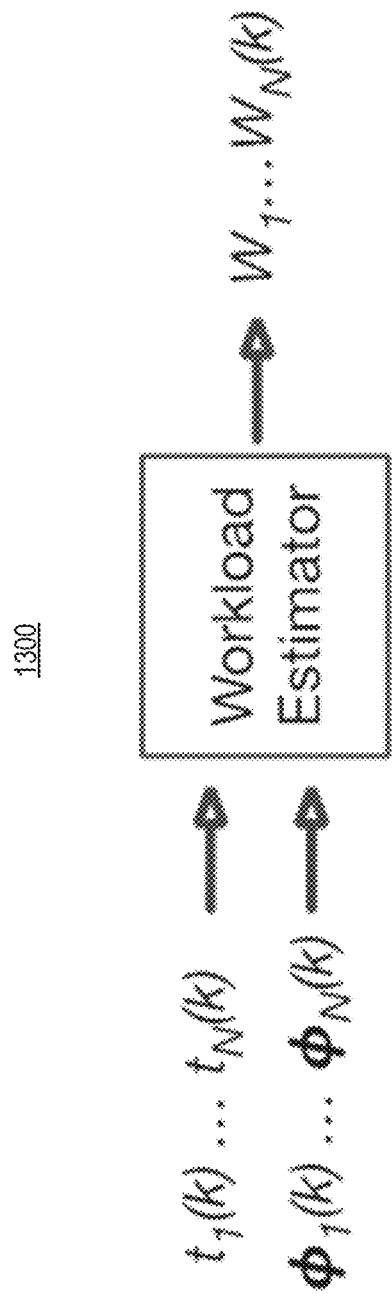
FIG. 13 illustrates one embodiment of a workload estimator circuit in accordance with various aspects as described herein.

FIG. 13 illustrates a workload estimator that calculates the statistical distribution of the workloads for the different services based on the current set of shares and the sampled execution times $t_i$ of each of the services i. A key insight here is the relation between the workload distribution and the service time distribution. While this figure is only drawn for one service chain to simplify notation, multiple service chains are supported.

Figure 14:
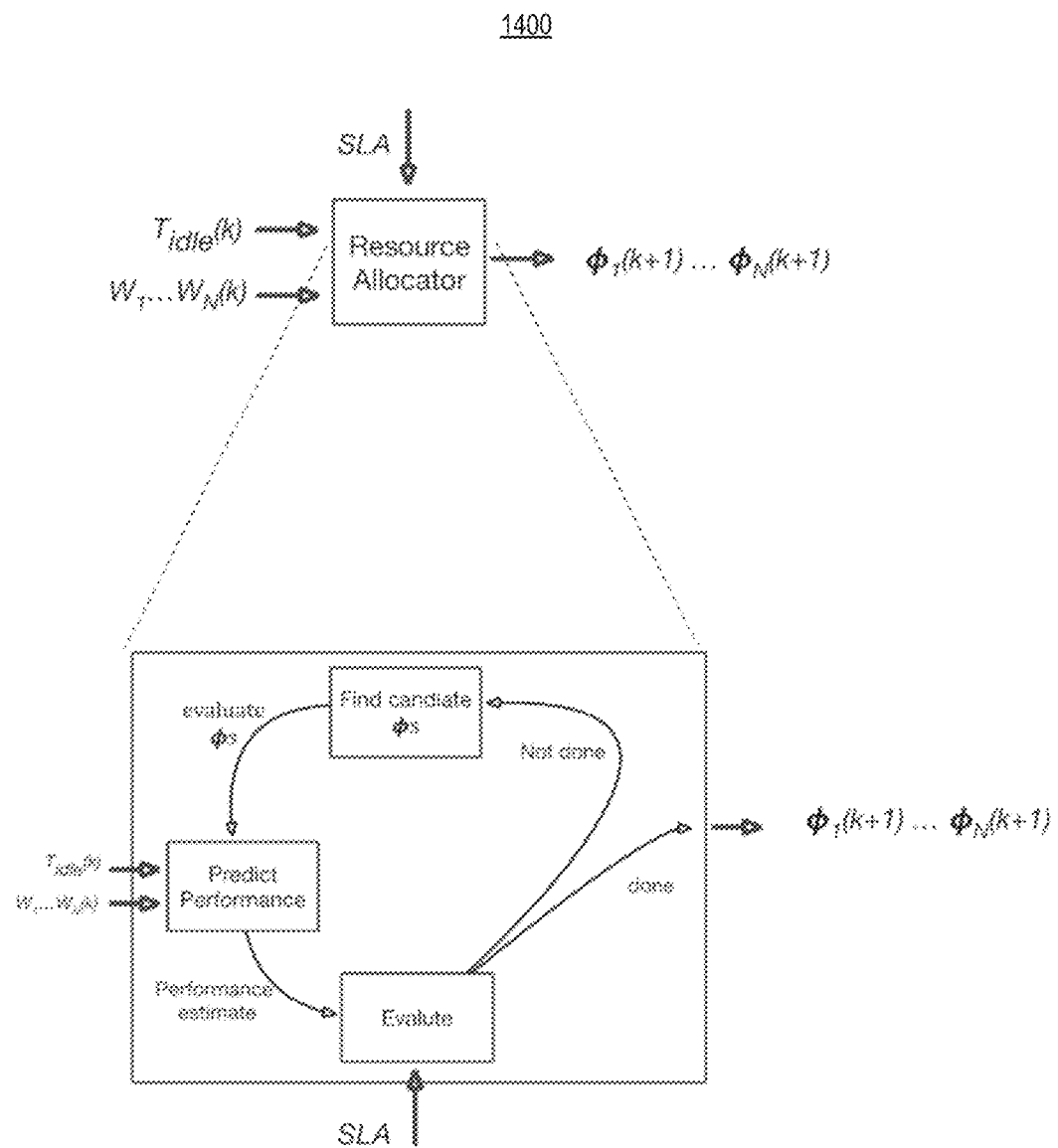
FIG. 14 illustrates one embodiment of a resource allocator circuit in accordance with various aspects as described herein.

The output from the workload estimator is used by the resource allocator to calculate the new compute resource shares. The resource allocator components are shown in FIG. 14. The resource allocator determines how compute resource are divided among the different service chains based on the statistical distribution of the workload that is calculated by the workload estimator. While this figure is only drawn for one service chain to simplify notation, multiple service chains are supported. In FIG. 14, a find candidate block produces a set of possible shares φ(k), for example, using standard optimization approached such as steepest descent or genetic algorithms. A predict performance block estimates the system behavior given the CPU share candidates. The algorithm for this block is found in Section VII below. This is a core part of this disclosure where a Markov model is used to predict the latency for both the individual services as well as the end-to-end latency for the service chains. Finally, we compare the predicted performance with requested performance determined by the SLA to either terminate the optimization and use the new shares or continue searching.

This disclosure provides the means to distribute compute resources on a cloud platform such that the average and tail latencies across a set of service chains are optimized (e.g., minimize SLA violation). The innovation is not tied to latencies but does generalize to other properties such as power and economical aspects.

Resource Management in the Mission Critical Cloud:

I. Introduction

Cloud technology has swiftly transformed the ICT industry and it is starting to make inroads in more classical industries, such as manufacturing, mining, etc. The benefits are similar in reduced CAPEX and OPEX, but the challenges are slightly different compared to many traditional ICT applications. Industrial applications have stronger requirements on timing and availability. For example, controlling a set of collaborating robots on an assembly line or vehicles in a platoon will demand tight requirements on the computation delays. In particular, we believe that the tail latencies are of special interest (i.e., the maximum response time will limit the possible performance). In order to take the cloud concepts beyond the ICT domain and apply it to mission critical use cases such as industrial automation, transport and health care, we must be able to provide guarantees and predictability performance. In this paper, we discuss the design of an adaptive cloud platform suitable for hosting automation and control system applications. The use case in mind are large scale control system where signals are sampled and transmitted to the cloud, where control signals are calculated and sent back to the actuators in the plant. We envision the control systems running in the cloud to be advanced optimization algorithms (e.g., model predictive control systems) requiring substantial compute power and with a varying execution time. In our model, the processing time is described as a statistical distribution not known beforehand. The compute resources in the cloud can be dynamically shared between different control loops. The task at hand is to distribute compute resource among a set of control loops such that average and tail latencies do not violate timing requirements expressed in a service level agreements. To this end we develop a method to estimate the workload distributions and use them as input to a feedback based cloud resource manager that controls how compute power is shared. We develop a control law that that aims at reducing the tail latency and we show how this works out for different set of simulated workload distributions.

II. System Description

We envision an application with one or more execution steps that are performed in the Cloud rather than being executed locally on the device (e.g., due to the device's limited capacity or missing functionality). Each execution step is referred to as a service and a sequence of services is referred to as a service chain or chain simply. All services in the chain will execute exactly once before a new chain execution can start and two services of the same chain cannot execute at the same time. Each service j is unique and can only be part of at most one chain. The expected service execution time is described by a performance requirement defined by a Service Level Agreement (SLA) containing three parameters: the mean execution time and a two-parameter percentile (e.g., 95% of the requests should be finalized within 10 ms). We further assume that the complete chain is required to fulfill a certain performance requirement also described by the same three-parameter SLA. The service requirement put on a chain i is a triplet of parameters $(m_i, a_i, p_i)$ where:

$$m_i \geq E|T_i|, P(T_i \leq a_i) = p_i.$$ Equation (1)

where $T_i$ is the total response time for the complete chain i, and $a_i$ and $p_i$ are the percentile parameters. Also, each service j of chain i is described by the same triplet $(m_i, a_i, p_i)$ with the same meaning as defined in Equation (1). We will assume that the sum of the expected/required service times is not greater than that of the complete chain since the contrary would imply that the average execution time of the services is not sufficient to reach the chain's expected service time. Furthermore, this assumption will allow the system performance objective function described below to set the appropriate CPU shares such that the chains' performance objectives take priority over individual services performance objectives (i.e., it will allow that individual services also of other chains will fail its performance target if it helps a chain to reach its target).

A chain of services is deployed on at least one server in the cloud. The chain of services is connected through the communication mechanisms typically used for such deployment (e.g., services deployed on the same CPU could use the techniques for Inter Process Communication (IPC) (e.g., shared memory or message passing). Services deployed on different servers will use the networking facilities connecting the servers. Such deployment would, thus, impose longer delays and longer chain processing time.

The service processing time depends on the generated workload for each service j, $W_j$ (i.e., the number of instructions that shall be executed, the share of CPU core k assigned to service j, $\Phi_{k,j}$, and the CPU core capacity, C. It is assumed that all cores have the same capacity though the model can easily be extended to allow different CPU capacities. The execution time, $T_{k,j}$, is thus:

$$T_{k,j} = \frac{W_j}{\Phi_{k,j} C}.$$ Equation (2)

If the shares are relative, the instantaneous service rate depends on the mix of services currently running on the CPU core (i.e., the share $\Phi_{k,j}$, should be considered as being a random variable.

III. On Optimal Deployment

Services are executed in a non-pipe line order (i.e., we assume that a new request can only be issued when all services of the chain have executed and the request has received full execution). Thus, minimum dependency between services of different chains and maximum throughput is achieved when all services of the chain are deployed on a single core not shared with any other chains. All services are thus scheduled 100% of the available capacity and the handover processing between services is minimal. Hence, from a performance perspective, putting all services on the same CPU core may initially seem like the best solution. With these observations, we can at least say that when deploying a new chain and there exists a free CPU core, all services should be deployed on the same core. We can also conclude that upon release of a chain leaving a free CPU core, relocating/migrating a chain, preferably the most performance and resource demanding chain, to the free CPU core should be considered if the execution environment allows for transferring the service state.

Figure 15:
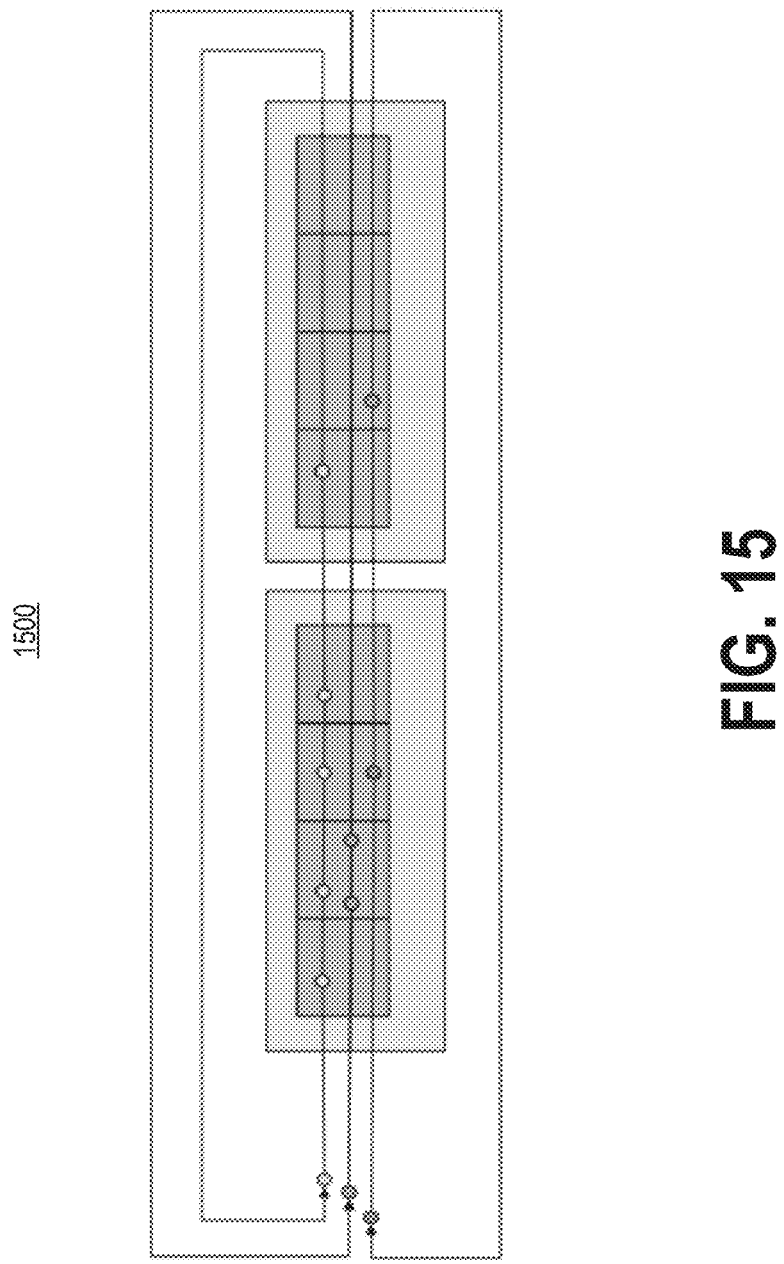
FIG. 15 provides an example of a dynamic distribution of service chains on a plurality of processors in accordance with various aspects as described herein.
Figure 16:
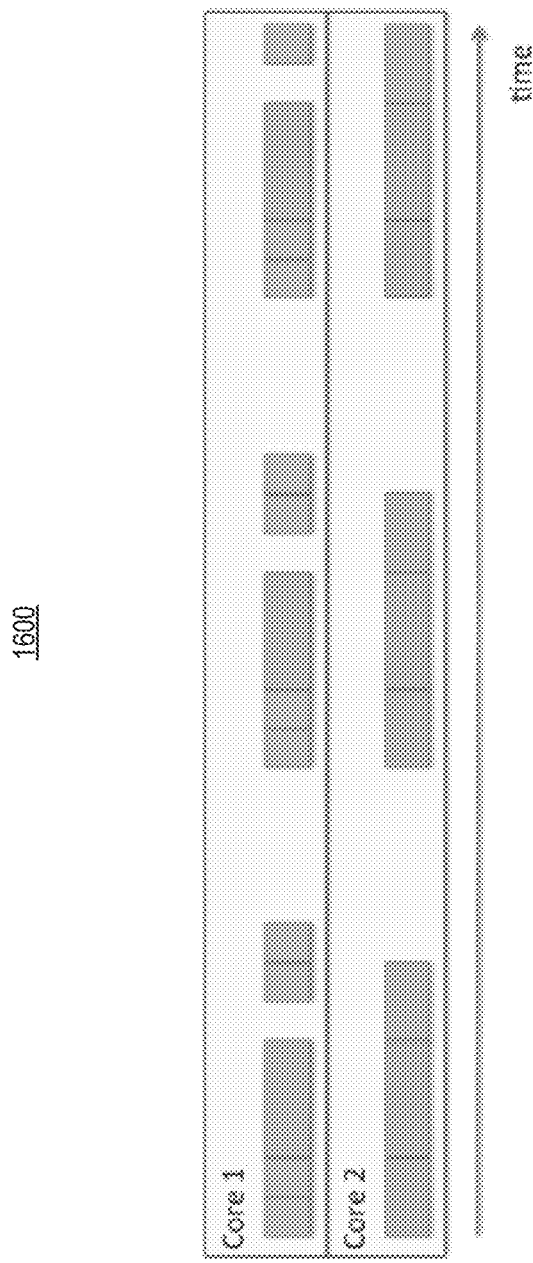
FIG. 16 provides another example of a dynamic distribution of service chains on a plurality of processors in accordance with various aspects as described herein.

This is of course a waste of CPU resources meaning that no further chains can be deployed when all CPU cores are utilized regardless of the service need of the existing services and chains. Consider the following example: assume a dual-core CPU serving two chains each with two services. Assume further that the execution time of the services of the first chain is one time unit for both services and that the idle time is four time units. For the second chain the service time is two (2) and three (3) time units respectively and the idle time is seven (7) time units. With above arguments, the two chains are deployed on the two cores. Note that the two chains cannot be deployed in the same core if the services shall be fully scheduled and no buffering is allowed. If a third chain, also with two services and with execution time three (3) and two (2) time units respectively and with an idle time of seven (7) time units would be deployed in the same CPU, then the third chain cannot be deployed on either core without affecting already deployed services or introducing a delayed execution of one of the new services. If, however, the two services of the third chain can be deployed on separate cores there exists a schedule for which none of the six services execute simultaneously with another service on the same core. FIG. 15 shows an example of a deployment of three chains on two servers with each having four CPU cores. FIG. 16 shows an example of three chains that cannot be deployed in any other constellation without making at least two services being scheduled simultaneously on the same core or that queuing delay is introduced. Hence, it is easy to see that deploying chains and services must deal with the problem of distributing services over several CPU cores and adjust the CPU shares of all the running services such that the system objective is best met. Furthermore, since all actions, whether it is execution, IPC communication and network communication, can be viewed as different types of delays, we should not be restricted to a single physical server when deploying a chain. Placing services on other servers' CPU cores may be necessary to consider if the connecting network transfer time is sufficiently short.

IV. The Need of a System Wide Objective Function

The main objective of the resource management algorithm is to find a deployment such that system throughput is maximized yet being able to provide services according to the SLAs, or in other words, minimizing the SLA violation. So, how do we know if a certain action (e.g., changing the scheduled share of a certain service) is successful or not with respect to the main objective? In order to make an a priori decision a sufficiently correct model of the system from which a performance value can be calculated is required. Alternatively, heuristics or exploratory methods can be used to determine where actions are needed but still the change needs to be evaluated.

Without a system wide objective, actions tend to only focus on controlling local mechanisms (e.g., control the response time for one or few services or a single chain, or be of a damage control nature (e.g., assign more resources to the service or chain that currently is the worst performer)). But, at least in an overload situation, adding resources to a service implies that resources must be taken from another service and it is not obvious how the execution of that service and consequently the chains changes when the CPU share is lowered. Thus, we believe that it is necessary for a resource manager to consider the complete system.

V. Absolute Vs. Relative Shares

The default Linux scheduler is the Completely Fair Scheduler (CFS). It is a fairness based scheduler using relative weights. The relative weights determine the rate at which the virtual run time increases while a task is running. The use of relative weights ensures that no task is starved in overload situation but it makes an attempt to implement some form of real-time service platform somewhat more difficult. The service rate of a specific task thus depends in the current set of active tasks. Furthermore, calculating the finish time of a task also requires information about the workload.

Absolute shares, on the other hand, require a limited set of running tasks. In Linux, the Deadline scheduler ignores any notion of fairness and its only goal is to schedule the tasks such that each task can execute its quanta, Q, within a time frame or period, P. In a sense, the deadline scheduler also operates with shares Q/P but not on the shorter time scales which typically the fairness based scheduler tries to address.

We will not assume that the tasks are fully known but the execution time is assumed to be bounded. The resource allocation algorithm will be based on a feedback loop which monitors the execution time and adjusts the CPU shares accordingly. The performance analysis is based on the behavior of the fairness scheduler. As a first step, we address and analyze the default CFS scheduler. It is, however, obvious and it has been verified that the deadline based on Earliest Deadline First (EDF) scheduler provides better performance and isolation that may be required in a mission critical execution platform. The use of the EDF algorithm is well analyzed. As the CFS is the default scheduler in Linux and there is little work done on CFS from a feedback control perspective, we choose to analyze CFS.

VI. A Generalized Processor Sharing Model

The fairness based algorithms, such as the CFS, are implementations of the theoretical Generalized Processor Sharing (GPS) fluid model. We will here use GPS to model CFS.

A. Calculating the End-to-End Delay

Under the assumption of exponentially distributed workloads and idle times, we can derive the joint steady state distribution of the chains being in one of its states. The probability distribution depends on the fix routing of the jobs (i.e., in the sequence as defined by the respective chains as well as the expected idle time, $\lambda^{-1}$, expected service time, $\mu^{-1}$ (i.e., the workload divided by the service rate). We define the state as:

$$I_1 \ldots I_n B_{1,1} \ldots I_{1,m} B_{2,1} \ldots B_{2,m} \ldots B_{c,1} \ldots B_{c,m}. \quad \text{Equation (3)}$$

where $I_i$ (idle) is one (1) if chain i is idle and zero (0) if not, and $B_{k,j}$ (busy) is one (1) if CPU core k is executing service j and zero (0) if it is not. Hence, there are n chains, c cores and m services. The system is thus described by an aperiodic and irreducible Markov process which ensures that there exists a unique steady state distribution. Given a state, v, described by Equation (3), the total flow intensity leaving that state is:

$$\Lambda(v) = \sum_{i=1\ldots} \lambda_i I_i(v) + \sum_{\ldots}\sum_{\ldots} \mu_{k,j}(v) B_{k,j}(v),$$

where $I_i(v)$ is one (1) when chain i is idle in state v and is zero (0) otherwise, and $\mu_{k,j}^{-1}(v)$ is the execution time of service j on CPU core k given state v. The execution time is simply the work load divided by the capacity:

$$\mu_{k,j}^{-1}(v) = \frac{\varpi_j}{\frac{\phi_j}{\sum_{i=1\ldots} \phi_i B_{k,i}(v)} C}, \quad \text{Equation (4)}$$

where $\varpi_j$ is the average work load of service j. The service rate thus depends on the set of active services on the specific CPU core and the core capacity is shared between the services according to the services' relative weights. The total intensity from state v' into state v is:

$$M(v',v) = \lambda_i R_i(0,j) 1[v'=v' \$ I_i \oplus B_{k',j}] + \mu_{k',j} R_i(j',j) 1[v=v' \$ B_{k',j} \oplus B_{k,j}] + \mu_{k',j} R_i(j',0) 1[v=v' \$ B_{k',j} \oplus I_i]$$

where $R_i(j,l)$ is one (1) if chain i executes service l when service j ends and zero (0) otherwise. The idle state is denoted as zero (0). Further, valid states are v and v' (i.e., if $B_{k,j}$ is set then service j actually is executed on core k according to the routing scheme/matrix R. Operator $\oplus$ sets a bit to one (1) and operator $ sets a bit to zero (0) in the state representation. $1[\square]$ is one (1) when statement $\square$ is true and zero (0) otherwise. The steady state distribution is then solved from the above equations, viz., $$\pi(v)\Lambda(v) = \sum_{v'} \pi(v') M(v',v),$$

and from the calculated distribution we get the probability that a given chain i is idle. But knowing that a chain is idle with probability:

$$P(idle_i) = \frac{T_{idle,i}}{T_{idle,i} + T_{busy,i}},$$

and that $T_{idle,i}$ is given from the system model, i.e., $$P(idle_i) = \sum_{v|I_i=1} \pi(v),$$

we can calculate $T_{busy,i}$ (i.e., the time spent in service). We can thus calculate the average processing time of each chain i given the routing (i.e., the placement of the services on the CPU cores, and the allocated share of each service on the CPU cores).

Figure 17:
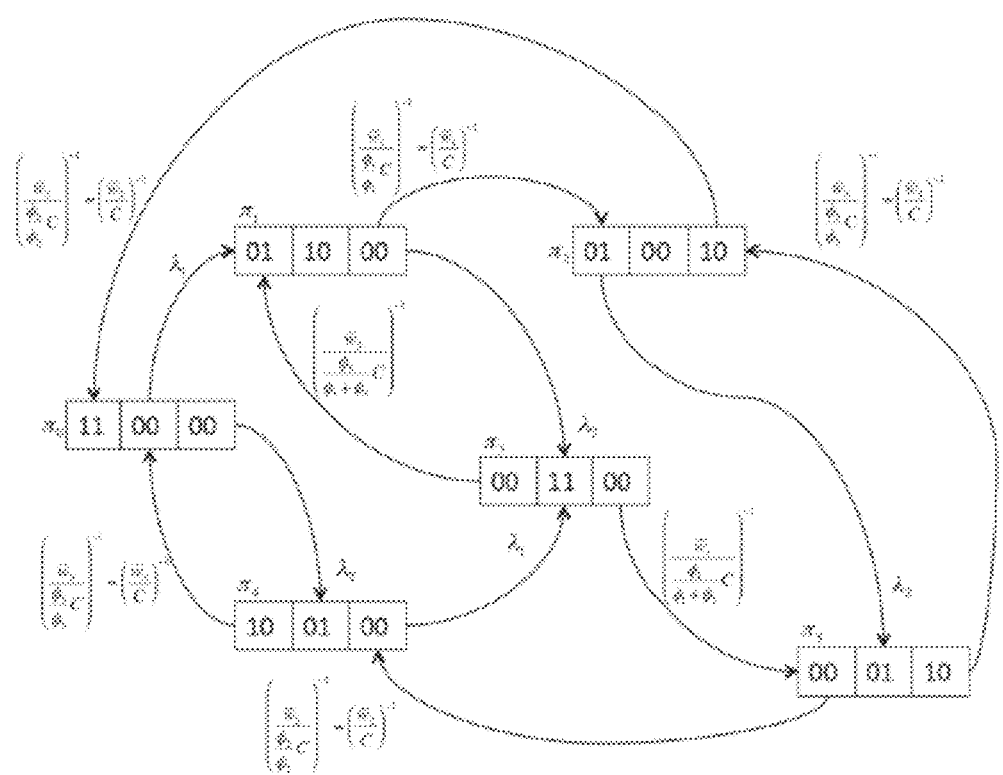
FIG. 17 provides one embodiment of a state diagram corresponding to a dynamic distribution of service chains on a plurality of processors in accordance with various aspects as described herein.

Example VI.1. Consider a dual core CPU with capacity C onto which two chains have their services deployed. Chain 1 implements two services which are deployed on different cores and chain 2 implements a single service which is deployed on the first core where the first service of chain 1 is deployed. The average idle time of respective chains is $\lambda_1^{-1}$ and $\lambda_2^{-1}$. The first service of chain 1 is described by its average workload $\overline{w}_1$ and is share $\phi_1$. The second service of chain 1 is, thus, described by $(\overline{w}_2, \phi_2)$ and the first service of chain 2 is described by $(\overline{w}_3, \phi_3)$. The state diagram is depicted in FIG. 17. The equations to solve for state probability $\pi$ is:

$$(\lambda_1 + \lambda_2)\pi_0 = \frac{C}{\overline{w}_2}\pi_2 \frac{C}{\overline{w}_3}\pi_4,$$

$$\left(\frac{C}{\overline{w}_1} + \lambda_2\right)\pi_1 = \lambda_1 \pi_0 + \frac{\phi_3}{\phi_1+\phi_3}\frac{C}{\overline{w}_3}\pi_3,$$

$$\left(\lambda_2 + \frac{C}{\overline{w}_2}\right)\pi_2 = \frac{C}{\overline{w}_1}\pi_1 + \frac{C}{\overline{w}_3}\pi_5,$$

$$\left(\frac{\phi_1}{\phi_1+\phi_3}\frac{C}{\overline{w}_1} + \frac{\phi_3}{\phi_1+\phi_3}\frac{C}{\overline{w}_3}\right)\pi_3 = \lambda_2 \pi_1 + \lambda_1 \pi_4,$$

$$\left(\lambda_1 + \frac{C}{\overline{w}_3}\right)\pi_4 = \lambda_2 \pi_0 + \frac{C}{\overline{w}_2}\pi_5,$$

$$\pi_0 + \pi_1 + \pi_2 + \pi_3 + \pi_4 + \pi_5 = 1.$$

The last equation, the summation to one (1), is set to break the linear dependence that would appear if the flow equation for the last state would be used. For example, for chain 1, we then have that it is idle with probability $\pi_0+\pi_4$ and, thus, the average service time for the entire chain is $\lambda_1^{-1}(1-\pi_0-\pi_4)/(\pi_0+\pi_4)$ time units.

B. Estimating the Service Rates

In this section, we will observe the execution of services on a single CPU core under the above assumptions (i.e., exponential service and idle time of the chains). If service j is executing on core k, the average service share that service j receives is then calculated as the average of the service shares over the states in which service j is served as:

$$E[\Phi_{k,j} | B_{k,j} = 1] = \sum_{v|B_{k,j}=1} E[\Phi_{k,j} | v, B_{k,j} = 1]P(v | B_{k,j} = 1).$$

$$= \sum_{v|B_{k,j}=1} \frac{\phi_j}{\sum_{j'=1...} \phi_{j'} B_{k,j'}(v)} P(v | B_{k,j} = 1)$$

The momentary share given the state is simply the share of the tagged service divided by the sum of all the shares of the services that are active at the same time in the given state. For convenience, the condition $B_{k,j}=1$ is omitted.

Continuing on Example VI.1, we get that the average service rate for service 1 on core 1 is:

$$\left(\pi_1 + \frac{\phi_1}{\phi_1+\phi_3}\pi_3\right)\frac{1}{\pi_1+\pi_3},$$

and the average service rate of service 3 on the same core is:

$$\left(\frac{\phi_3}{\phi_1+\phi_3}\pi_3 + \pi_4 + \pi_5\right)\frac{1}{\pi_3+\pi_4+\pi_5}.$$

C. Estimating the Service Time Distribution

Assuming that a service maintains its average service share throughout the execution, the service time distribution and consequently the probability that a service fails its SLA can be calculated (i.e., the average and the tail of the service time can be calculated). This assumption implies that the service time distribution of $T_{k,j}$ as defined by Equation (2) can be simplified when the service share can sufficiently well be modeled as a constant rather than a random variable. Therefore, we have that:

$$T_{k,j} = \frac{W_j}{E[\Phi_{k,j}]C}, \quad \text{Equation (5)}$$

which scales with the workload. Thus, given a workload distribution of a service, the service time distribution can be calculated, hence, the tail of the services and the complete chain can be calculated. The service time distribution is simply:

$$P(T_{k,j} \le t) = P\left(\frac{W_j}{E[\Phi_{k,j}]C} \le t\right), \quad \text{Equation (6)}$$

$$= F_{W_j}(t E[\Phi_{k,j}]C)$$

for a specific service j and the service time distribution for the complete chain is a convolution of the service time distributions for the services of that chain. The actual point which fulfills the percentile SLA requirement, $\hat{a}_{i,j}$, is easily calculated from the same equation. This point will be used in the system objective function later, though, any system cost function can be used depending on the objective.

We will, however, see that the assumption of maintaining the average service rate is not particularly accurate when there are few services active on the CPU core with varying service needs (i.e., any service change significantly changes the service rate of the observed service). In particular, for a lightly loaded system, it is often observed the case when a service receives full service (i.e., gets 100% of the CPU capacity).

VII. Calculating Initial Shares

Although it is possible to set the initial shares by random, we can to some level limit the initial transient procedure by instead make a qualified estimate of the expected resource shares for the given set of services. An optimization problem is formulated and the shares are calculated for each service deployed on a CPU core. The objective function is formulated as a penalty function where the scheduled workload for service $j$, $W_j$, is a random variable with density function $f_{W_j}(w)$. The penalty, $G_j$, is therefore also a random variable and the penalty function, $g_j(t)$, is a function which makes an execution time $t$ expensive if it deviates from the SLA parameters. The optimization problem can then be expressed as:

$$\underset{\underline{\phi}}{\text{minimize}} \sum_j E[G_j] = \sum_j \int_0^\infty E[G_j \mid W_j = w] f_{W_j}(w) dw$$

$$\text{s. to.} \quad \sum_j \phi_j = 1,$$

$$\phi_j > 0, \forall j$$

The probability density function can be estimated from sampling the running system or be known a priori (e.g., by running it alone on a single core).

Example: Define a penalty function:

$$g_j(t) = \max(0, (t - m_j) k_j),$$

where $m_j$ is the expected execution time of service $j$ and $k_j$ is a slope possibly depending on the SLA percentile parameters. Assume that the workload $W_j$ is exponentially distributed with mean $\bar{w}_j$, then the execution time is exponentially distributed with mean $\mu_j^{-1} = E[W_j]/((\phi_j C)$ and a fixed weight $\phi_j$. Hence, the penalty for service $j$ is:

$$E[G_j] = \int_{m_j}^\infty (t - m_j) k_j \mu_j e^{-\mu_j t} dt.$$

$$= \frac{k_j}{\mu_j} e^{-\mu_j m_j}$$

$$= \frac{k_j \bar{w}_j}{\phi_j C} e^{-\frac{\phi_j C m_j}{\bar{w}_j}}$$

Adding the KKT multiplier $\alpha$ for the constraint, we formulate the Lagrangian:

$$L(\phi, \alpha) = \sum_j \frac{k_j \bar{w}_j}{\phi_j C} e^{-\frac{\phi_j C m_j}{\bar{w}_j}} + \alpha \left( \sum_j \phi_j - 1 \right).$$

Calculating the gradient at points $\phi_j$ we get that:

$$\frac{\partial L}{\partial \phi_j} = -\frac{k_j \bar{w}_j}{\phi_j^2 C} e^{-\frac{\phi_j C m_j}{\bar{w}_j}} - \frac{k_j \bar{w}_j}{\phi_j C} \frac{C m_j}{\bar{w}_j} e^{-\frac{\phi_j C m_j}{\bar{w}_j}} + \alpha = 0 \quad \text{Equation (7)}$$

i.e., $$\alpha = \frac{k_j}{\phi_j} \left( \frac{\bar{w}_j}{\phi_j C} + m_j \right) e^{-\frac{\phi_j C m_j}{\bar{w}_j}}, \forall j.$$

Setting Equation (7) equal for any services $i$ and $j$ we get the relation between $\phi_i$ and $\phi_j$ $\forall i,j$. The gradient at point $\alpha$ gives us that the sum of the shares equal to one. We thus normalize the relative shares $\phi_j$ and we get the actual $\phi_j$ for all $j$. With little modification of above calculations, any other distribution can be considered though some density functions are more tractable than other. However, these types of calculations imply the use of absolute weights and where the shares are (re)calculated upon a change in the set of active services. In a scenario with a limited number of services we could consider a table of calculated shares given a mix of services, either pre-calculated shares or dynamically updated when a new combination of services becomes active.

We do not address hard deadlines since we believe it is motivated to also consider system objective functions which, e.g., address an economic aspect of executing services. For example, functions which consider the revenue of adding new services and chains v.s. the cost of enabling execution resources and violating SLAs due to too little available resources. The penalty function is, thus, only a means for presenting a discontent with long execution times. Still, there is the uncertainty in the assumption regarding the workload distribution but on a running system measurement reports can be used to estimate the workload distribution. We will do this in the following section.

VIII. Model Verification and Simulation Results

In this section, we will verify our model using a mix of chains with different service requirements and shares. We will investigate two different distributions of the workloads, namely the exponential distribution and the uniform distribution centered around the workload mean. We will also see that the GPS is very forgiving regarding the service and idle time distributions meaning that we can basically use any distribution and the above calculations give very good results. It is, however, easy to prove that the state probability distribution in this setting does depend on the service and idle time distributions.

Two chains with three and two services respectively will be deployed on two CPU cores. Each service, $S(x,y)$, is characterized with its workload $W_j$, share $\phi_j$ and SLA parameters $(m_{i,j}, a_{i,j}, p_{i,j})$ where $m_{i,j}$ is the requested average execution time, $a_{i,j}$ and $p_{i,j}$ is the percentile as described in Section II. See Table I below for chosen parameters.

TABLE I

System Parameters for the Selected System

| $j$ | $E[W_j]$ | $\phi_j$ | $(m_{i,j}, a_{i,j}, p_{i,j})$ |
|---|---|---|---|
| Chain 0, $\lambda_0^{-1} = 1.0$ | | | |
| S(0, 0) | 0.5 | 0.3 | (0.8, 1.1, 0.9) |
| S(0, 1) | 1.0 | 0.4 | (1.5, 2.0, 0.9) |
| S(0, 2) | 2.0 | 0.4 | (3.0, 5.0, 0.9) |
| Chain 1, $\lambda_1^{-1} = 0.5$ | | | |
| S(1, 0) | 0.3 | 0.7 | (0.5, 0.7, 0.9) |
| S(1, 1) | 0.4 | 0.6 | (0.6, 1.1, 0.9) |

Figure 18:
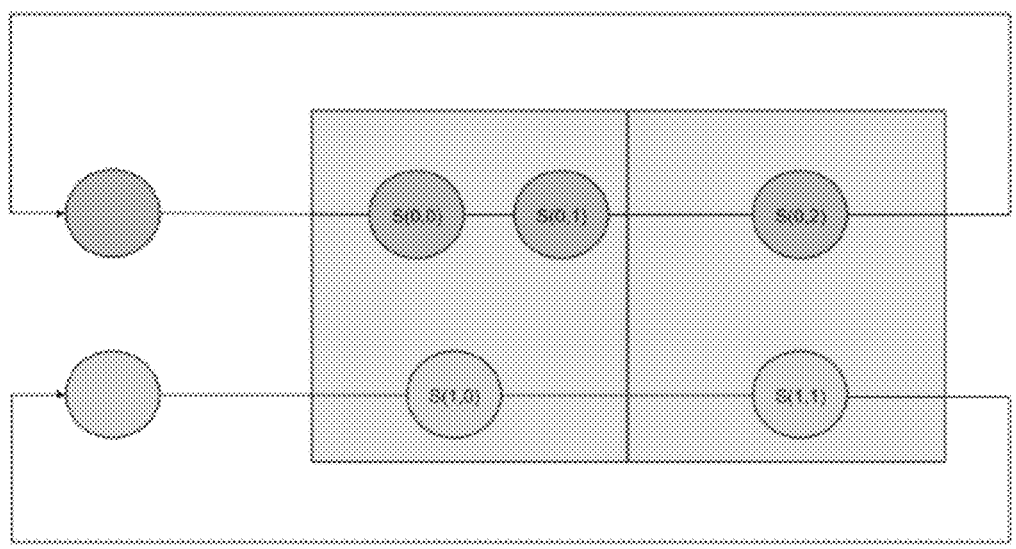
FIG. 18 provides another example of a dynamic distribution of service chains on a plurality of processors in accordance with various aspects as described herein.
Figure 19A:
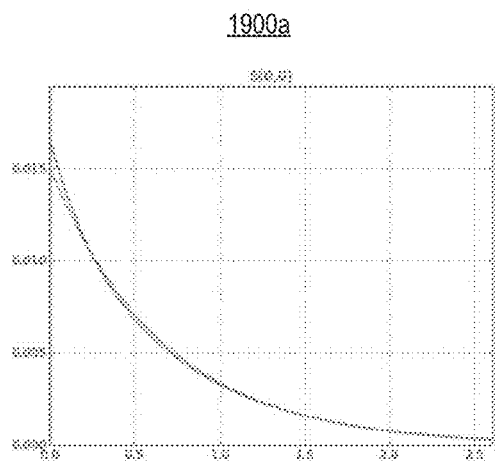
FIGS. 19A-D show probability density functions of service time distributions corresponding to a dynamic distribution of service chains on a plurality of processors in accordance with various aspects as described herein.
Figure 19B:
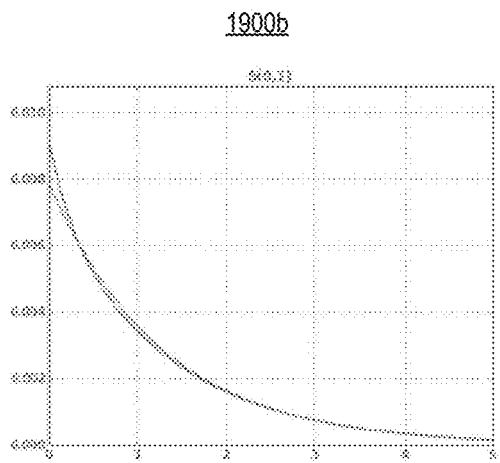
Figure 19C:
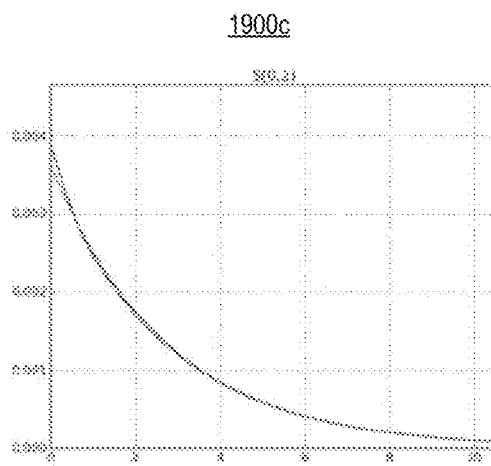
Figure 19D:
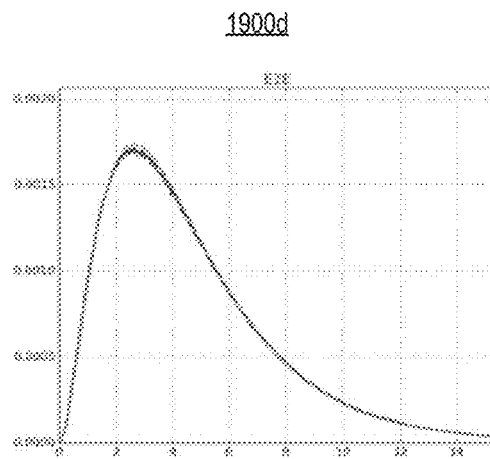
Figure 20A:
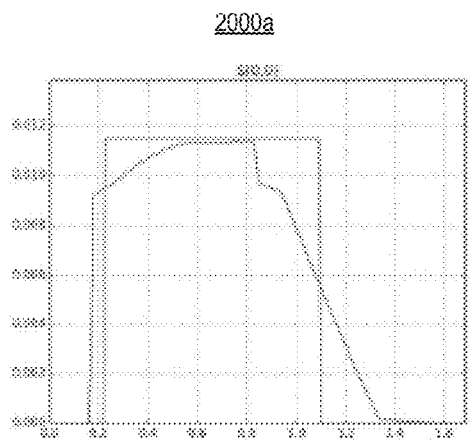
FIGS. 20A-D show probability density functions of service time distributions corresponding to a dynamic distribution of service chains on a plurality of processors in accordance with various aspects as described herein.
Figure 20B:
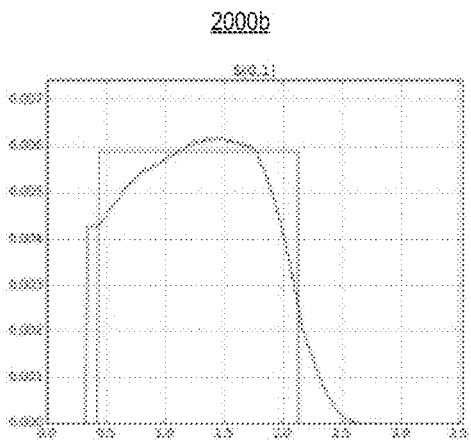
Figure 20C:
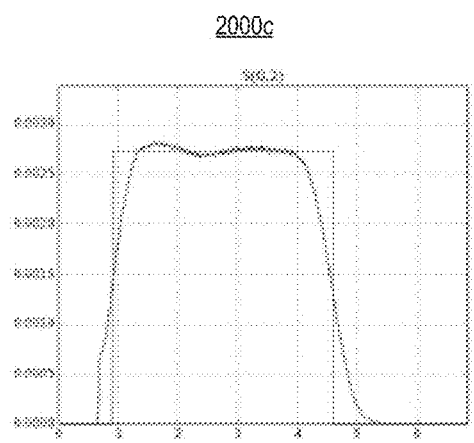
Figure 20D:
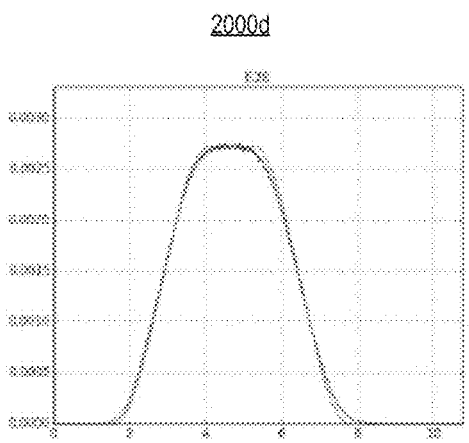

Services S(0,0), S(0,1) and S(0,2) of Chain 0 are connected in sequence where S(0,0) and S(0,1) are executed on CPU core 0 and S(0,2) is executed on CPU core 1. Services S(1,0) and S(1,1) of Chain 1 are connected in sequence where S(1,0) is executed on CPU core 0 and S(1,1) is executed on CPU core 1. See FIG. 18. The CPU capacity C is normalized to one (1) (i.e., we can view $W_j$ as the ideal execution time when the service gets full CPU share.

The choice of the exponential distribution is mainly to verify that the parameters that can be calculated exactly should be verified by the simulations. The uniform distribution is chosen because it is not smooth and its support is limited (i.e., it will make the tail estimation less accurate).

A. Exponentially Distributed Idle and Service Times

In FIGS. 19A-D, we see that an exponentially distributed workload receives little distortion and seemingly the service time is also exponentially distributed. This is however not the case and it is easily verified that two services with exponentially distributed workloads and idle times will not experience exponentially distributed service times.

It is expected that the simulated result and the calculations of $E[T_{k,j}]$ and $E[\Phi_{k,j}]$ match as these can be derived from the state distribution shown in Section VI-A. The tail is easily calculated from Equation (6) as $$P(T_{k,j} > a_{i,j}) = e^{-\frac{a_{i,j} E[\Phi_{k,j}] C}{E[W_j]}}, \quad \text{Equation (8)}$$

and the point at which the tail requirement actually is fulfilled, $\hat{a}_{i,j}$, is given from the same equation. It is expected that the results from the calculations and simulations regarding the average processing time for the chain, $E[T_i]$, and the probability that the chain is idle, $P(\text{idle}_i)$, are equal as these entities are derived from the state distribution.

B. Uniformly Distributed Idle and Service Time

The uniform distribution is unlike the exponential distribution not smooth and it has a bounded support and, hence, is a good contrast to the exponential distribution investigated above.

In Table II below, we see that calculations and simulations fit very well yet in FIGS. 20A-D we see a more noticeable difference.

TABLE II

Performance Metrics. Exponentially Distributed Idle and Service Time

| j | $E[T_{k,j}]$ | $E[\Phi_{k,j}]$ | $P(T_{k,j} > a_{i,j})$ | $\hat{a}_{i,j}$ |
|---|---|---|---|---|
| | | Calculation | | |
| S(0, 0) | 0.671 | 0.745 | 0.194 | 1.545 |
| S(0, 1) | 1.276 | 0.784 | 0.209 | 2.939 |
| S(0, 2) | 2.765 | 0.723 | 0.164 | 6.368 |
| S(1, 0) | 0.356 | 0.843 | 0.140 | 0.819 |
| S(1, 1) | 0.523 | 0.765 | 0.148 | 1.205 |
| | | Simulation | | |
| S(0, 0) | 0.671 | 0.745 | 0.196 | 1.545 |
| S(0, 1) | 1.276 | 0.783 | 0.211 | 3.090 |
| S(0, 2) | 2.765 | 0.723 | 0.165 | 6.530 |
| S(1, 0) | 0.356 | 0.843 | 0.140 | 0.840 |
| S(1, 1) | 0.523 | 0.765 | 0.149 | 1.250 |

Seemingly, the fix average service rate captures the greater mass of the probability density function but misses the extremes (i.e., when a service is served alone on a core and when a service receives its smallest service share). Since the number of services that can be served simultaneously is only two for both cores, any scenario that deviates from the assumption is noticed. In particular, services S(0,0) and S(1,0), both with short service times but different cycle times and service shares will receive great variations in service. Although the individual density function of a service time does not fit perfectly with the simulation, the calculated end-to-end service time distribution however fits very well with the simulation yet it seems a little conservative. Again, it is likely that the calculations capture the probability mass well enough, at least for the services in our example, that the convolution also makes a good fit. The method, thus, becomes more accurate as the number or services that can execute simultaneously increases.

In Table III below, we notice that the calculated weight of the tail is zero for some services.

TABLE III

Performance Metrics. Uniform Distributed Idle and Service Time.

| j | $E[T_{k,j}]$ | $E[\Phi_{k,j}]$ | $P(T_{k,j} > a_{i,j})$ | $\hat{a}_{i,j}$ |
|---|---|---|---|---|
| | | Numeric | | |
| S(0, 0) | 0.671 | 0.745 | 0.020 | 1.029 |
| S(0, 1) | 1.276 | 0.784 | 0.075 | 1.957 |
| S(0, 2) | 2.765 | 0.723 | 0.000 | 4.240 |
| S(1, 0) | 0.356 | 0.843 | 0.000 | 0.546 |
| S(1, 1) | 0.523 | 0.765 | 0.000 | 0.802 |
| | | Simulation | | |
| S(0, 0) | 0.651 | 0.788 | 0.064 | 1.040 |
| S(0, 1) | 1.277 | 0.783 | 0.085 | 2.180 |
| S(0, 2) | 2.743 | 0.729 | 0.002 | 4.220 |
| S(1, 0) | 0.354 | 0.847 | 0.029 | 0.590 |
| S(1, 1) | 0.520 | 0.769 | 0.046 | 0.890 |

The simple reason is that the SLA parameter $a_{i,j}$ according to Table I is greater than the worst case execution time assuming a fix service rate. The worst case execution time, $W_{max}/\phi_{min}$, is longer and it is verified with simulations. For example, for service S(1,0) the longest execution time is $0.5/(7/11)=0.786$ time units and for S(1,1) it is $2/(3*0.6)=1.111$ time units, which the simulation verifies.

IX. Proposed Architecture

A. Components

1) Core Controller: The Core Controller (CC) monitors the execution of the services and the chains and reports the execution time to the Workload Estimator (WE). Each service is monitored and the execution time is piggybacked with the response of the service and is forwarded to the next service in the chain. Once the last service of the chain has finished the piggybacked execution times are forwarded to the WE. The CC thus knows which services that currently are deployed on the cores and it adjusts the shares when updates arrive. The CC also needs to monitor the incoming requests to the system. The time difference between the last departure and the new arrival marks an idle period and it is used for estimating the idle time $\lambda_i^{-1}$ for all chains i. The average idle time is calculated over a window of one hundred (100) samples. The average idle time is sent to the WE along with the service time measurements.

2) Workload Estimator: The WE is responsible for collecting the measurement and creating a model of the workload needed to perform the calculations above. The parameters needed to perform the calculations is the idle time for each service, sent by the CC, and the departure rates as defined in Equation (4). Given these parameters, the Resource Calculator (RC) can calculate a set of CPU shares that best fulfills the objective function. In the current implementation, the WE keeps histograms over the service times received from the CC and the histograms thus define the service time distribution. With the assumption that the workload scales with the average service rate, the workload mean and distribution is calculated from Equations (5) and (6), respectively.

Since we envision services which perform a special task with a fairly consistent behavior yet has an obvious peak at some point that represents the typical or more common activity, we fit the sampled execution time to a Γ distribution and, if that fails, to a triangular distribution. The estimated parameters are piggybacked to the RC.

In Section VI-C we did the opposite (i.e., from a known workload distribution tried to calculate the time distribution). We do this since we in the general case to not know anything about the nature of the deployed service and that we can better address the tail of the processing time.

The feedback from the RC contains a new set of shares that the CC shall apply and consequently a changed behavior is expected from the execution of the services. Hence, it is necessary for the workload estimator to forget historic data that reflects an old behavior and the model must thus forget this history. In our model, we limit the number of samples in the histogram (i.e., whenever the number of samples becomes larger than a certain value the histogram is rescaled to half its mass). This simple approach enables some form of dynamics in the estimator as it allows that old samples eventually disappears but it does not consider the actual age of the samples. A fresh new sample of a new setting may also be forgotten. This approach thus tracks where the majority of the probability mass is located. Having a method of discarding samples purely based on age could potentially clear all history at times. In this study, we rescale when the number of samples exceed two hundred and fifty (250). This scheme could be improved by better correlating the history with the CPU share updates and possibly the size of the update. Simply building statistics of the last N samples would likely work sufficiently well. Note that also a parameter fitting model not keeping a histogram still needs to have a limited memory. The inertia of the system but also the accuracy depend on the refresh rate of the samples.

As mentioned, the histograms are also used for estimating the distribution of the total service time of all the services. Respective histogram is convoluted into a joint distribution being the stochastic sum of the service times of the services in the chain. The alternative would of course be to simply build a histogram over the sum of the execution times at the same time when building the histograms over the services. However, when the memory mechanism discards old data the corresponding scaling of the total execution time is not obvious due to the integer arithmetic. It is simply easier to perform the convolution.

3) Resource Calculator: The RC determines the service rate of the services by adjusting respective service's CPU share and the average service rate is calculated from the model and the performance metrics are derived from this average service rate.

The WE determines when the RC shall execute. Since the calculation itself requires CPU resources the RC cannot execute too frequently. On the other hand, the system also needs to be responsive to changes and it needs to find its optimal solution within reasonable time and therefore should execute as much as possible. But there is no need to execute unless the recorded service execution times present some level of significance. We address these conflicting demands by (soft) limiting the execution time and separate the execution in time. In each round, at least one iteration is performed and as many iterations that can be completed within two hundred and fifty milliseconds (250 ms) (i.e., the execution time of each iteration is monitored and averaged).

Thus, we have:

numIterations=max(1,0.25/avgIterTime).

The optimization is performed such that all CPU cores are visited in a round-robin fashion where a number of iterations is performed on each core before moving on to the next core. The number of iterations per core is limited to four (4). So, we have that:

numIterPerCore=min(numIterations,4).

When the total number of iterations becomes equal to numIterations, the current computation stops and continues on the same core on the next computation instance (i.e., the algorithm remembers how many iterations that remains to be done on the current core).

As mentioned, the time between the computations shall be performed when there is some level of significance in the measurements. Here, we put no greater effort on this and we set the time to be at least ten seconds (10 s) and shall at least contain ten (10) rounds of execution per chain on average unless it takes more than thirty seconds (30 s). The initial time interval is set to thirty seconds (30 s). The average chain execution time is averaged over all chains and upon the time for calculating a new set of shares the time until the next optimization round (i.e., the time that system shall run with the new set of shares) is calculated as:

runTime=max(10,min(30, 10*numChains*avgChain$T$)).

The objective function used in this study calculates a relative error which is a measure of the distance from the target values according to the SLA. For each service j if chain i the error is calculated as:

$$e_{i,j,k}^m = \max\left(0, \frac{E[T_{k,j}] - m_{i,j}}{m_{i,j}}\right), \quad \text{Equation (9)}$$

$$e_{i,j}^a = \max\left(0, \frac{\hat{a}_{i,j} - a_{i,j}}{a_{i,j}}\right),$$

$$e_{i,j,k} = (\gamma \cdot e_{i,j,k}^m + (1-\gamma) \cdot e_{i,j}^a)^2,$$

where γ is a weight which determines the importance of respective component. Here, we have set γ=¼ (i.e., we let the tail dominate the offset). The complete chain (i.e., the end-to-end latency) can be handled as analogous to that of the services.

The system objective function can then be defined in many ways. One way is to consider the total relative offset (i.e., summarize Equation (9) over all i,j,k and find the set ϕ which minimizes this sum. This approach may initially seem like the proper choice and the system does find the set of shares that minimizes the objective function. At least it finds a local minimum. However, it has been observed that for some parameters (e.g., SLA parameters or mix of services and chains) the optimum may be to sacrifice the performance of one or a few services in order to keep the sensitive services happy. This may make perfect sense when, for example, maximizing the revenue is the objective where it pays to keep the gold customer happy. We choose to instead to keep all customers equally happy (or unhappy) and we do this by minimizing the maximum offset over all the services (i.e., as $$\underset{\phi}{\text{minimize}} \underset{i,j,k}{\max} e_{i,j,k}).$$

We could also put other aspects into the objective function (e.g., minimize the energy consumption per active service yet deliver service according to the SLAs) (i.e., it will be an activity of deploying as many services as possibly on the available cores and at some point it will be beneficial to "startup" another server and use that too).

Initially, we started with an own implementation of a steepest descent algorithm, but we found that the function landscape is a moving target due to the relative shares and the next iterative step was not necessarily better. One solution would be to take smaller steps but that is a rather unattractive solution. Instead, we evaluate all services/directions but only take a step in the direction that is the best. The algorithm is of course not the quickest but it is more robust. Since the behavior of the services is a random process and where there are mechanisms for forgetting history, we have reduced the risk of getting stuck in a tight local minimum. The risk is not eliminated and there should be safety mechanisms for identifying or preventing such scenarios (e.g., by taking steps of random length or take a long step when we seem to be stuck). This has not been done in this study and is left for the implementation in our MCC platform.

So far, we have monitored the services and controlled the system based on the performance of the services. A chain with possibly stringent SLA requirements may thus not be properly considered. An alternative would be to monitor the performance of the chains, possibly using the same equations as for the services as defined bxy Equation (9), and calculate the shares based on such an objective function. But then it may be that a specific service performs poorly given its SLA. The middle way would be to consider both the services' and the chains' SLAs possibly by formulating this directly in the objective function or by finding means for dynamically compensating such services in the implementation. We leave this of problems for the implementation in our MCC platform.

Figure 21:
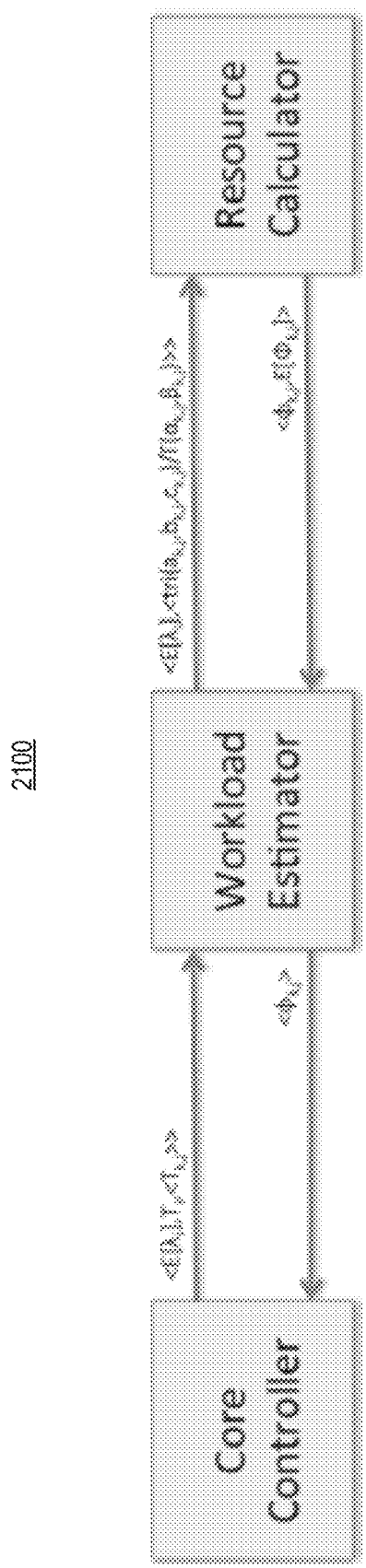
FIG. 21 illustrates another embodiment of a controller for managing computational resources in accordance with various aspects as described herein.

FIG. 21 depicts a block diagram over the system components and the flow of exchanged information.

X. Results

In this section, we will test the described system. First and foremost, we expect that the feedback loop actually can find an optimum to operate around. It is, however, difficult to verify that a global optimum is found, if such exists, but we can easily verify that a poor local optimum is not found by inspecting the offset/cost of the individual services. Since we aim to minimize the maximum offset (i.e., we do not expect that any service stand out with a significantly bad offset). If that would happen it could be an indication that the optimization algorithm does not find its way out of the local minimum. This is where we should consider ways of escaping such scenarios as mentioned earlier. No such poor local minimum was identified.

We observe a dual core system carrying three chains and six services and using a low CPU core capacity C. The intention is to keep the resource manager active and to see how well the workload estimator can capture the tail of the execution time of the services.

Initially, all services are deployed on one core and half way through the simulation we migrate service S(2,2) onto the second core. Table IV below summarize the system settings.

TABLE IV

Simulation Parameters for the Dual Core CPU. The Ideal Execution Time on Average is, for example for S(0, 0), 0.2/2 = 0.1 Time Units when the Core Capacity is 2 Instructions per Time Unit.

| j | $E[W_j]$ | $\phi_j$ | $(m_{i,j}, a_{i,j}, p_{i,j})$ |
|---|---|---|---|
| Chain 0, $\lambda_0^{-1}$ = 1.0 | | | |
| S(0, 0) | 0.2 | 0.18 | (0.15, 0.2, 0.9) |
| S(0, 1) | 0.5 | 0.13 | (0.30, 0.5, 0.9) |
| Chain 1, $\lambda_1^{-1}$ = 0.5 | | | |
| S(1, 0) | 0.4 | 0.20 | (0.30, 0.7, 0.9) |
| Chain 2, $\lambda_2^{-1}$ = 0.7 | | | |
| S(2, 0) | 0.8 | 0.18 | (0.50, 1.0, 0.9) |
| S(2, 1) | 0.3 | 0.11 | (0.15, 0.3, 0.9) |
| S(2, 2) | 0.7 | 0.20 | (0.50, 0.8, 0.9) |

The workload will be generated from a triangular distribution and the initial weights are calculated according to the ideas outlined in Section VII. The optimization problem is numerically solved where we use the tri-distributed distribution and the penalty function is defined in the example using a slope $k_j$=1. Assuming no knowledge about the workload, we use the parameters of the SLA to estimate a service workload that is uniformly distributed and centered around the expected execution time in the interval $[m_{i,j}/2, 1.5\ m_{i,j})$. The solution to the problem is the initial CPU shares used in the simulation which we denoted $\phi_j^0$ and they are listed in Table IV above.

We choose only to present the results from services S(0,0), as it shows the most variation in its behavior, and the migrating service S(2,2).

A. Tri-Distributed Workloads

Figure 22A:
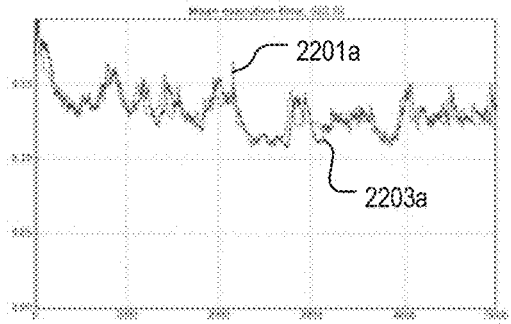
FIGS. 22A-D show tri-distributed workloads corresponding to a dynamic distribution of service chains on a plurality of processors in accordance with various aspects as described herein.
Figure 22B:
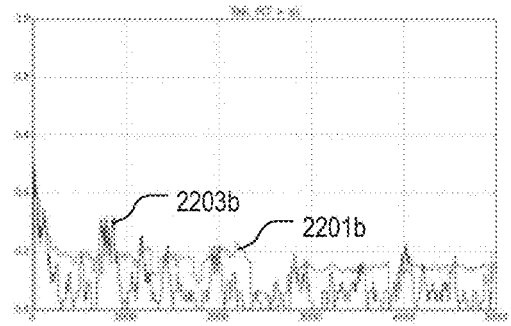
Figure 22C:
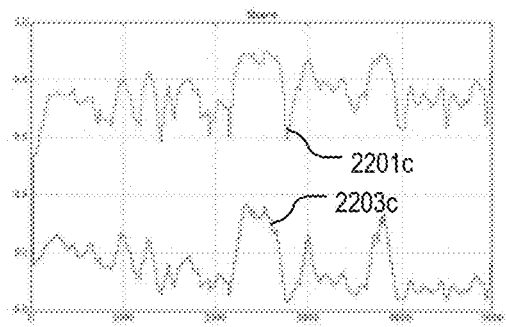
Figure 22D:
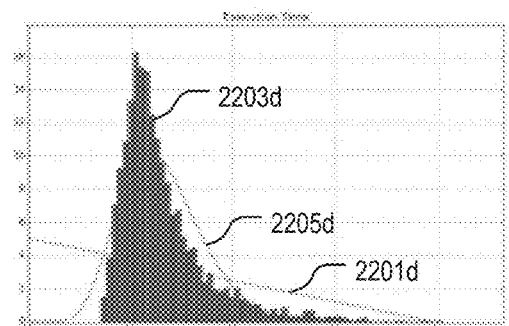
Figure 23A:
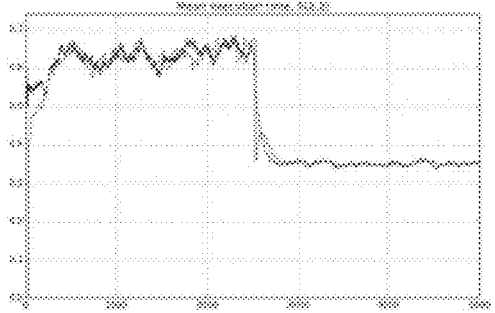
FIGS. 23A-D show tri-distributed workloads corresponding to a dynamic distribution of service chains on a plurality of processors in accordance with various aspects as described herein.
Figure 23B:
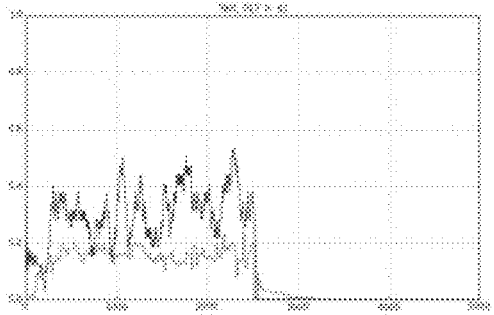
Figure 23C:
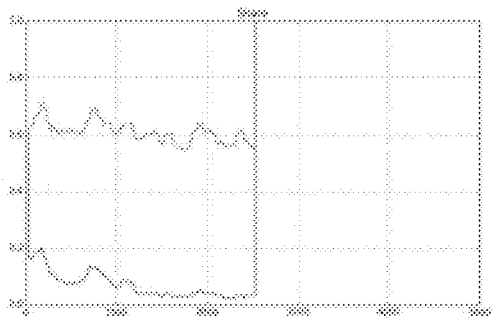
Figure 23D:
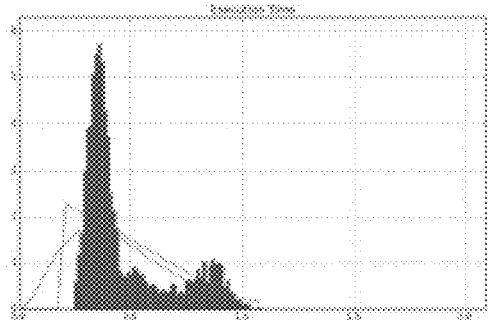

The workload is generated from a symmetric triangular distribution defined on the interval [0.7 m, 1.3 m] where m is the workload mean. In FIGS. 22A-D, we see how the average execution time and the tail varies over time and also the execution time distribution of the service over the full simulation interval. FIG. 22A shows a plot 2200a of the mean execution time 2201a with the filtered mean of the execution time 2203a-line 2201a (faster variation) being the experienced mean and line 2203a (less varying) being the calculated mean execution time. This is based on the calculated average share and we see that the calculation and actual execution times fit well. FIG. 22B shows a plot 2200b of the tail estimation which is less accurate due to the limited CPU capacity (i.e., the probability of all services being active at the same time is non-negligible and there will be a significant tail in the execution time distribution which the triangle distribution does not capture very well). That tail is thus overestimated resulting in a higher calculated cost and thus a higher assigned share. FIG. 22D shows a plot 2200d of the execution time distribution 2203d with a fit with the triangular distribution 2201d and also a fit with a Γ distribution 2205d. Seemingly, the Γ distribution 2205d does a better job of capturing the tail. FIG. 22C illustrates a plot 2200c of the shares that show the calculated relative weight 2203c and the calculated average share 2201c. Prior to the migration of service S(2,2) at half-time, we see a larger variation of the assigned shared and thus also in the mean execution time. This is due to the limited capacity and the tight SLA requirements but there may also be oscillation tendencies due to the inertia in the system in combination with the optimization algorithm taking only one direction at the time. A better fit of the tail using the Γ distribution will likely limit the variation.

The RC captures the migration well and finds the new operation point quickly as seen by FIGS. 23A-D. Also, when the migrated service finds an empty CPU core it does not need to compete for resources and experiences a more stable execution environment which we see as a less varying mean execution time. In the execution time plot, we see how the service execution time is centered around the expected 0.35 time units after migration. Not only is there a smaller spread in the execution time but there is also more samples due to the shorter chain execution time. The throughput of the chain has increased as the chain execution time has dropped from ca 1.58 time units to 1.25 time units. Chains 0 and 1 have also improved their throughput since they are competing less with Chain 2.

B. Observations

Seemingly, the RC is careful (slow) which is a combination of i) the time between calculations, ii) the step size of the optimization algorithm, iii) the limited run time of the calculation, iv) the size of the memory in the management of the service execution time histograms, and v) the window size in the windowed mean value calculation of the execution time. There is inertia in the system that is not yet fully explored. Furthermore, an even larger system with more chains, services, and CPU cores would be even slower but measures are taken so that the RC does not take too much resources when performing its calculations but this is at the expense of a slower resource manager. This implies that work remains in optimizing the resource manager itself but also that it is important to find a good set of initial weights. Using the simple approach presented in Section VII, we get a set of shares which is not capable of capturing the dynamics and dependence between services, yet it does give a hint of which services that have tight SLA requirements and sets initial shares accordingly.

XI. Reserved

XII. Conclusions

We have proposed a resource management algorithm for a cloud based system that serves applications or processes deemed as mission critical. The algorithm calculates the proper CPU shares to set for the different services based on its estimated workload and expected level of service as defined by a Service Level Agreement (SLA). The parameters describing the expected latency are the expected execution time and the percentile defining the tail of the execution time. The fairness based scheduler of the system is assumed to be sufficiently well modelled as a Generalized Processor Sharing (GPS) node and by calculating the execution time of the services as well as for the complete service chain we can evaluate the performance towards the expected SLA to either accept or reject the candidate shares. We consider the workload estimation and the statistical model of the system as the key components which enable the performance evaluation.

Although not explicitly stated in the paper, the proposed algorithm does not need to execute on the same system which carries the services and can therefore be deployed elsewhere.

By means of simulations we have evaluated the proposed algorithm and we verify that the GPS model and the system performance analysis are sufficiently accurate. The analysis allows us to predict the execution time of the services and chains such that new CPU shares can be set and actuated and, hence, we can control the system performance.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

The invention claimed is:

1. A method, performed by a controller, for managing computational resources, the method comprising:
dynamically distributing computational resource shares among sequential services that are mapped to one or more processors, wherein each sequential service corresponds to an execution step of a remote application and wherein a service chain comprises at least one sequential service, based on estimated and predetermined tail latencies and average execution times of each sequential service in the service chain as well as the service chain such that the latencies are met, and wherein one or more service chains are executed contemporaneously;
wherein dynamically distributing the computational resource shares comprises, for each service chain:
determining a statistical distribution of a workload for each service of the service chain based on the computational resource shares, and on current execution times for the services of the service chain for a current execution of the service chain; and
allocating the computational resource shares for the services of the service chain for a next execution of the service chain based on the statistical distributions and on the estimated and predetermined tail latencies of the service chain.

2. The method of claim 1, wherein the determining the statistical distribution of the workload for each service of the service chain is further based on a processing capacity of a corresponding processor.

3. The method of claim 1, wherein the allocating includes:
determining candidate computational resource shares of available computational resource shares for the services of that chain based on the statistical distributions;
determining the estimated tail latency of that chain based on the candidate shares of the service chain and an average execution time of the service chain; and
evaluating whether to use the candidate shares of the service chain as the next shares for the service chain based on the estimated and predetermined tail latencies of th the service chain.

4. The method of claim 3, wherein the allocating further includes:

determining the average execution time of the service chain and each sequential service in the service chain based on an idle time and a probability that the service chain is idle; and
wherein the evaluating is also based on the average execution time of the service chain.

5. The method of claim 3, wherein determining the estimated tail latency of the service chain includes evaluating the service chain using a Markov process.

6. The method of claim 3, wherein the allocating further includes:
determining an estimated latency for each service of the service chain based on the candidate shares of the service chain; and
wherein the evaluating is also based on the latencies of the services of the service chain.

7. The method of claim 6, wherein estimating the latency for each service of the service chain includes evaluating the services of the service chain using a Markov process.

8. The method of claim 1, wherein the services of at least one of the service chains are associated with a control loop of the remote application.

9. The method of claim 1, wherein the controller is operationally coupled to the one or more processors via a network.

10. The method of claim 1, wherein the controller is operationally coupled to the one or more processors via an electrical bus.

11. The method of claim 1, wherein all of the services of the service chain are executed during a current execution of the service chain prior to any service of the service chain being executed during a next execution of the service chain.

12. The method of claim 1, wherein each service of the service chain is executed only once during each execution of the service chain.

13. The method of claim 1, wherein one service of the service chain may not execute contemporaneous with another service of the service chain.

14. The method of claim 1, wherein the one or more processors are operationally coupled to the remote application via a wireless network.

15. A controller for managing computational resources, comprising:
processing circuitry;
memory containing instructions executable by the processing circuitry whereby the controller is operative to:
dynamically distribute computational resource shares among sequential services that are mapped to one or more processors, wherein each sequential service corresponds to an execution step of a remote application and wherein a service chain comprises at least one sequential service, based on estimated and predetermined tail latencies and average execution times of each sequential service in the service chain as well as the service chain such that the latencies are met, and wherein one or more service chains are executed contemporaneously;
wherein, for each service chain, dynamically distributing the computational resource shares comprises:
determining a statistical distribution of a workload for each service of the service chain based on the computational resource shares, and on current execution times for the services of the service chain for a current execution of the service chain; and
allocating the computational resource shares for the services of the service chain for a next execution of the service chain based on the statistical distributions and on the estimated and predetermined tail latencies of the service chain.

16. A non-transitory computer readable recording medium storing a computer program product for managing computational resources, the computer program product comprising software instructions which, when run on processing circuitry of a controller, causes the controller to:
dynamically distribute computational resource shares among sequential services that are mapped to one or more processors, wherein each sequential service corresponds to an execution step of a remote application and wherein a service chain comprises at least one sequential service, based on estimated and predetermined tail latencies and average execution times of each sequential service in the service chain as well as the service chain such that the latencies are met, and wherein one or more service chains are executed contemporaneously;
wherein dynamically distributing the computational resource shares comprises, for each service chain:
determining a statistical distribution of a workload for each service of the service chain based on the computational resource shares, and on current execution times for the services of the service chain for a current execution of the service chain; and
allocating the computational resource shares for the services of the service chain for a next execution of the service chain based on the statistical distributions and on the estimated and predetermined tail latencies of the service chain.

* * * * *